(12) United States Patent
Itoshiro et al.

(10) Patent No.: US 10,477,871 B2
(45) Date of Patent: Nov. 19, 2019

(54) NETTED CASING FOR FOOD

(71) Applicant: OCI CO., LTD., Hyogo (JP)

(72) Inventors: Hajime Itoshiro, Hyogo (JP); Koichi Takahashi, Hyogo (JP)

(73) Assignee: OCI CO., LTD., Hyogo (JP)

( * ) Notice: Subject to any disclaimer, the term of this patent is extended or adjusted under 35 U.S.C. 154(b) by 218 days.

(21) Appl. No.: 14/772,704

(22) PCT Filed: Apr. 17, 2014

(86) PCT No.: PCT/JP2014/060890
§ 371 (c)(1),
(2) Date: Nov. 23, 2015

(87) PCT Pub. No.: WO2014/171501
PCT Pub. Date: Oct. 23, 2014

(65) Prior Publication Data
US 2016/0120195 A1    May 5, 2016

(30) Foreign Application Priority Data

Apr. 17, 2013 (JP) ................................ 2013-086775

(51) Int. Cl.
*A22C 13/00* (2006.01)
*B32B 5/02* (2006.01)
(Continued)

(52) U.S. Cl.
CPC .......... *A22C 13/00* (2013.01); *A22C 13/0013* (2013.01); *A22C 13/02* (2013.01);
(Continued)

(58) Field of Classification Search
CPC ........ A22C 13/0013; A22C 2013/0046; A22C 2013/0096; Y10T 428/1324
(Continued)

(56) References Cited

U.S. PATENT DOCUMENTS

| 5,203,142 A | 4/1993 | Kollross |
| 6,180,150 B1 * | 1/2001 | Schafer ................. B65D 29/04 |
| | | 426/105 |

(Continued)

FOREIGN PATENT DOCUMENTS

| JP | S57-153520 | 9/1982 |
| JP | S57153520 | 9/1982 |

(Continued)

OTHER PUBLICATIONS

Japanese Office Action—Notice of Reasons for Refusal; Reference No. P130417A; dated May 24, 2016; 7 pgs.
(Continued)

*Primary Examiner* — Laura C Powers
(74) *Attorney, Agent, or Firm* — Vedder Price P.C.

(57) ABSTRACT

Provided is a netted food casing, which prevents a net from being easily separated from a nonwoven fabric, can inhibit inclusion of foreign substances, and is used as an inexpensive packing material. A netted food casing (X) includes a nonwoven fabric (1) and a net (2). The nonwoven fabric (1) includes a thermoplastic synthetic fiber, and the net (2) includes one of a thermoplastic resin and a thermoplastic synthetic fiber. The nonwoven fabric (1) and the net (2) are thermally laminated to form the netted food casing (X).

7 Claims, 11 Drawing Sheets

(51) Int. Cl.
*B32B 5/26* (2006.01)
*A22C 13/02* (2006.01)
*B32B 1/08* (2006.01)
*B32B 7/04* (2019.01)

(52) U.S. Cl.
CPC ............... *B32B 1/08* (2013.01); *B32B 5/022* (2013.01); *B32B 5/028* (2013.01); *B32B 5/26* (2013.01); *B32B 7/04* (2013.01); *A22C 2013/026* (2013.01); *B32B 2250/02* (2013.01); *B32B 2250/20* (2013.01); *B32B 2262/0253* (2013.01); *B32B 2262/0276* (2013.01); *B32B 2439/70* (2013.01)

(58) Field of Classification Search
USPC .......................... 426/129; 427/402; 428/34.8
See application file for complete search history.

(56) References Cited

U.S. PATENT DOCUMENTS

| | | | | |
|---|---|---|---|---|
| 2004/0253398 | A1* | 12/2004 | Mintz | A22C 13/00 428/34.8 |
| 2008/0020105 | A1* | 1/2008 | Rieser | A22C 13/0013 426/129 |
| 2010/0255230 | A1* | 10/2010 | Hihnala | A22C 13/0013 428/34.8 |

FOREIGN PATENT DOCUMENTS

| | | | |
|---|---|---|---|
| JP | S61-28379 | | 2/1986 |
| JP | H2-78084 | | 6/1990 |
| JP | 04253654 | * | 9/1992 |
| JP | 5-115244 | A | 5/1993 |
| JP | H5-115244 | | 5/1993 |
| JP | 5-146247 | A | 6/1993 |
| JP | H5-146247 | | 6/1993 |
| JP | 6-312494 | A | 11/1994 |
| JP | H6-312494 | | 11/1994 |
| JP | 3021977 | | 12/1995 |
| JP | 3021977 | | 3/1996 |
| JP | H8-150690 | | 6/1996 |
| JP | U3104485 | | 7/2004 |
| JP | 2004-242944 | | 9/2004 |
| JP | 2012-55869 | | 3/2012 |
| JP | 2012-55869 | A | 3/2012 |

OTHER PUBLICATIONS

Official Action dated Sep. 29, 2015 in connection with corresponding Japanese Patent Application No. 2013-086775. 6 pages with English translation (5 pages).
Japanese Search Report Relative to PCT/JP2014/060890, 4 Pages.

* cited by examiner

NETTED CASING FOR FOOD

BACKGROUND OF THE INVENTION

1. Field of the Invention

The present invention relates to a casing to be used for shaping, packing, and producing a processed food product typified by a processed meat product, a processed fish product, a processed dairy product, or the like. In particular, the present invention relates to a netted food casing obtained by integrating a nonwoven fabric and a net (mesh), which include a thermoplastic synthetic fiber, by thermal lamination.

2. Description of the Related Art

Heretofore, as a food casing to be used for a processed meat product such as ham, sausage, roast beef, roast pork, salami, bacon, or raw meat, a fibrous casing or the like has mainly been used. The fibrous casing is produced by, for example, shaping hemp paper or a nonwoven fabric into a tubular bag and impregnating the product with viscose. Further, a food casing including a thermoplastic synthetic fiber has been proposed (Japanese Utility Model Application Laid-open No. Hei 02-78084).

Raw material meat (chunk of meat or kneaded meat) for ham, sausage, or the like is stuffed into a food casing, subjected to a smoking step or the like, and formed into a processed meat product such as ham or sausage. The smoking step is performed by smoking the raw material meat to improve preservation stability and to decoratively color, flavor, and season the raw material meat.

Meanwhile, in order to shape or decorate raw material meat for ham, sausage, or the like, the raw material meat is directly tied with a string or a net (mesh), or a food casing stuffed with the raw material meat is tied with a string or a net, and the resultant product is subjected to the smoking step or the like to produce a processed meat product.

The direct tying of the raw material meat with a string or a net or the tying of a food casing stuffed with the raw material meat with a string or a net increases the time for shaping the raw material meat and deteriorates productivity.

Further, when the raw material meat is directly tied with a string or a net, the string or the net gets into the raw material meat. As a result, it is difficult to separate the string or the net from the processed meat product such as ham or sausage before eating, and the string or the net remains in the processed meat product such as ham or sausage, which generates a number of complaints.

For that reason, at the present day, in order to facilitate separation of the string or the net, a food casing is tied with the string or the net so that the string or the net can easily be separated together with the casing.

As the netted food casing, Japanese Utility Model Registration No. 3104485 discloses a netted food casing obtained by sewing a net into a bag-like casing. In Japanese Utility Model Registration No. 3104485, the bag-like casing is formed so as to have a bag shape by rolling original paper for casing into a tubular shape, bonding the overlapped ends of the tubular material, interfolding an opening at one end of the tubular material, and sewing the interfolded part.

The net is shaped into a closed-end tubular material, and is allowed to cover the outside of the bag-like casing. The net is sewn with a thread at the both ends of the bag-like casing.

Processed meat products such as ham, sausage, roast beef, and roast pork are sold on a large scale as gifts sent at the end of the year. For that reason, there is an urgent need to rationalize production of the products, and a netted casting for food corresponding to rationalization of production of the processed meat products is required.

However, the netted food casing of Japanese Utility Model Registration No. 3104485 is formed by sewing a net with a thread at both ends of the bag-like casing to integrate the net with bag-like viscose, and hence provides low productivity and expensive packing materials.

Further, the net is sewn with the thread at both ends of the bag-like casing, and there is a risk that the net may be separated from the bag-like casing when the casing is stuffed with raw material meat for ham, sausage, or the like.

Further, there is a risk that the thread for sewing the net at both ends of the bag-like casing may be loosened and mixed in the raw material meat.

SUMMARY OF THE INVENTION

The present invention has been made in consideration of the problems described above and an object of the present invention is to provide a netted food casing that is obtained by integrating a nonwoven fabric and a net, which include a thermoplastic synthetic fiber, by thermal lamination, prevents the net from being easily separated from the nonwoven fabric, can inhibit foreign substances from being mixed in food, and is used as an inexpensive packing material.

According to a first embodiment of the present invention, there is provided a netted food casing, including:

a nonwoven fabric including a thermoplastic synthetic fiber; and a net laminated on the nonwoven fabric, the net including one of a thermoplastic resin and a thermoplastic synthetic fiber, in which the netted food casing is formed by thermally laminating the nonwoven fabric and the net.

According to a second embodiment of the present invention, in the netted food casing according to the first embodiment, the nonwoven fabric includes a polyethylene fiber, and the net includes one of a polyethylene resin and a polyethylene fiber.

According to a third embodiment of the present invention, in the netted food casing according to the first embodiment, the nonwoven fabric includes a polyester fiber, and the net includes one of a polyester resin and a polyester fiber.

According to a fourth embodiment of the present invention, in the netted food casing according to the first embodiment or the second embodiment, the nonwoven fabric includes a composite fiber including a polyethylene fiber and a plant fiber.

According to a fifth embodiment of the present invention, in the netted food casing according to the first embodiment or the third embodiment, the nonwoven fabric includes a composite fiber including a polyester fiber and a plant fiber.

According to a sixth embodiment of the present invention, in the netted food casing according to the first embodiment or the second embodiment, the net includes a low melting point polyethylene resin and a high melting point polyethylene resin.

According to a seventh embodiment of the present invention, in the netted food casing according to the first embodiment or the third embodiment, the net includes a polyester fiber.

According to an eighth embodiment of the present invention, there is provided a netted food casing, including:

a nonwoven fabric including a thermoplastic synthetic fiber; and a net laminated on the nonwoven fabric, the net including one of a thermoplastic resin and a thermoplastic synthetic fiber, in which the nonwoven fabric and the net are thermally laminated to form a netted nonwoven fabric, and in which the netted nonwoven fabric is shaped into a tubular bag by thermal pressure bonding.

According to a ninth embodiment of the present invention, there is provided a netted food casing, including:

a nonwoven fabric including a thermoplastic synthetic fiber, and a net laminated on the nonwoven fabric, the net including one of a thermoplastic resin and a thermoplastic synthetic fiber, in which the nonwoven fabric and the net are thermally laminated to form a netted nonwoven fabric, in which the netted nonwoven fabric is shaped into a tubular bag by thermal pressure bonding, and in which the netted nonwoven fabric shaped into a tubular bag is shaped into a shirred form.

According to a tenth embodiment of the present invention, there is provided a netted food casing, including:

a nonwoven fabric including a thermoplastic synthetic fiber; and a net laminated on the nonwoven fabric, the net including one of a plant fiber and a rayon fiber, in which the netted food casing is formed by thermally laminating the nonwoven fabric and the net.

In the first embodiment of the present invention, the netted food casing is used for shaping, packing, and producing processed food products, for example. Examples of the processed food products include a processed meat product, a processed fish product, and a processed dairy product. Examples of the processed meat product include ham, sausage, roast beef, roast pork, salami, and bacon. Examples of the processed fish product include fish sausage and fish ham. An example of the processed dairy product is cheese.

In the first embodiment of the present invention, firstly, the nonwoven fabric includes the thermoplastic synthetic fiber, and the net (mesh) includes the thermoplastic resin (or thermoplastic synthetic fiber).

With this, the nonwoven fabric has a heat seal property as well as air permeability and water permeability. The net has a heat seal property.

Secondly, the nonwoven fabric and the net are thermally laminated.

In thermal lamination, the nonwoven fabric and the net are thermally pressure-bonded by compressing the nonwoven fabric and the net under heating at a melting point equal to or higher than the glass transition point of the thermoplastic resin (thermoplastic synthetic fiber) to melt the thermoplastic synthetic fiber of the nonwoven fabric and the thermoplastic resin (or thermoplastic synthetic fiber) of the net. The melted thermoplastic synthetic fiber of the nonwoven fabric is in contact with the net, and the melted thermoplastic resin (or thermoplastic synthetic fiber) of the net is in contact with the melted thermoplastic synthetic fiber and gets into among the fibers of the nonwoven fabric. With this, the nonwoven fabric and the net are bonded (pressure-bonded). The melted thermoplastic synthetic fiber and the melted thermoplastic resin (or thermoplastic synthetic fiber) serve as binders (adhesives) for bonding the nonwoven fabric to the net.

After the thermal lamination, the melted thermoplastic synthetic fiber and the melted thermoplastic resin (or thermoplastic synthetic fiber) are solidified by cooling to be bonded integrally.

Then, the thermoplastic synthetic fiber of the nonwoven fabric solidified by cooling and the thermoplastic resin (or thermoplastic synthetic fiber) of the net solidified by cooling firmly integrate the nonwoven fabric and the net.

With this, for example, in production of a processed meat product, even when the netted food casing is stuffed with raw material meat (chunk of meat or kneaded meat) for ham, sausage, or the like, the net is not separated from the nonwoven fabric and is not mixed in the raw material meat. Further, the net includes the thermoplastic resin (or thermoplastic synthetic fiber), and hence is elastically deformed along with the raw material meat and brought into close contact with the raw material meat together with the nonwoven fabric to exhibit a decoration effect.

Further, in the first embodiment of the present invention, it is preferred that the net be laminated over the front surface of the nonwoven fabric to bring the reverse surface of the net into contact with the front surface of the nonwoven fabric, and the nonwoven fabric and the net be then heated from the reverse surface of the nonwoven fabric to thermally laminate the nonwoven fabric and the net.

With this, the thermoplastic resin (or thermoplastic synthetic fiber) on the reverse surface side of the net and the thermoplastic synthetic fiber of the nonwoven fabric can be melted without causing deformation and melting on the front surface side of the net to firmly pressure-bond the net to the nonwoven fabric and to exhibit a decoration effect of the net.

Further, in the first embodiment of the present invention, the nonwoven fabric and the net are preferably thermally laminated using a laminating machine. With this, the netted food casing can be formed continuously, and an inexpensive packing material can be provided.

In the second embodiment of the present invention, the nonwoven fabric and the net include the polyethylene fiber (or polyethylene resin) that is the same thermoplastic synthetic fiber (or the same thermoplastic resin), and hence the nonwoven fabric and the net can be pressure-bonded under heating at the same heating temperature. The heating temperature is a melting point equal to or higher than the glass transition point of the polyethylene fiber (or polyethylene resin).

With this, the heating temperature at which the nonwoven fabric and the net are heated is easily controlled. Further, the polyethylene fiber (polyethylene resin) is a general resin, and hence can be used to produce the nonwoven fabric and the net inexpensively.

In the third embodiment of the present invention, the nonwoven fabric and the net include the polyester fiber (or polyester resin) that is the same thermoplastic synthetic fiber (or the same thermoplastic resin), and hence the nonwoven fabric and the net can be pressure-bonded under heating at the same heating temperature. The heating temperature is a melting point equal to or higher than the glass transition point of the polyester fiber (or polyester resin).

With this, the heating temperature at which the nonwoven fabric and the net are heated is easily controlled. Further, the polyester fiber (polyester resin) is a general resin, and hence can be used to produce the nonwoven fabric and the net inexpensively.

In the fourth embodiment of the present invention, the nonwoven fabric includes the composite fiber including the polyethylene fiber and the plant fiber. As a result, even when the polyethylene fiber of the nonwoven fabric is melted in thermal lamination, air permeability and water permeability can be maintained by the plant fiber.

The plant fiber may be a cotton fiber, a hemp fiber, a pulp fiber, a rayon fiber, or the like.

In the fifth embodiment of the present invention, the nonwoven fabric includes the composite fiber containing the polyester fiber and the plant fiber. With this, even when the polyester fiber of the nonwoven fabric is melted in thermal lamination, air permeability and water permeability can be maintained by the plant fiber.

The plant fiber may be a cotton fiber, a hemp fiber, a pulp fiber, a rayon fiber, or the like.

In the sixth embodiment of the present invention, the net includes the composite resin including the low melting point polyethylene resin and the high melting point polyethylene resin. With this, when the net and the nonwoven fabric are compressed in thermal lamination while heating the net at a melting point equal to or higher than the glass transition point of the low melting point polyethylene resin, the low melting point polyethylene resin and the high melting point polyethylene resin can be melted to thermally pressure-bond the nonwoven fabric to the net.

Further, the net has flexibility (elastic deformability) by virtue of the low melting point polyethylene resin. For example, the net can be deformed along with raw material meat (chunk of meat or kneaded meat) for a processed meat product such as ham or sausage, can maintain the shape of the ham, the sausage, or the like, and can improve shirring processing suitability.

In the seventh embodiment of the present invention, the net includes the polyester fiber. With this, when the net and the nonwoven fabric are compressed in thermal lamination while heating the net at a melting point equal to or higher than the glass transition point of the polyester fiber, the polyester fiber can be melted to thermally pressure-bond the nonwoven fabric to the net.

Further, the net has flexibility (elastic deformability) by virtue of the polyester fiber. For example, the net can be deformed along with raw material meat (chunk of meat or kneaded meat) for a processed meat product such as ham or sausage, can maintain the shape of the ham, the sausage, or the like, and can improve shirring processing suitability.

In the eighth embodiment of the present invention, the netted food casing is used for shaping, packing, and producing processed food products, for example. Examples of the processed food products include a processed meat product, a processed fish product, and a processed dairy product. Examples of the processed meat product include ham, sausage, roast beef, roast pork, salami, and bacon. Examples of the processed fish product include fish sausage and fish ham. An example of the processed dairy product is cheese.

In the eighth embodiment of the present invention, firstly, the nonwoven fabric includes the thermoplastic synthetic fiber, and the net (mesh) includes the thermoplastic resin (or thermoplastic synthetic fiber).

With this, the nonwoven fabric has a heat seal property as well as air permeability and water permeability. The net has a heat seal property.

Secondly, the nonwoven fabric and the net are thermally laminated to form the netted nonwoven fabric.

In thermal lamination, the nonwoven fabric and the net are thermally pressure-bonded by compressing the nonwoven fabric and the net under heating at a melting point equal to or higher than the glass transition point of the thermoplastic resin (thermoplastic synthetic fiber) to melt the thermoplastic synthetic fiber of the nonwoven fabric and the thermoplastic resin (or thermoplastic synthetic fiber) of the net. The melted thermoplastic synthetic fiber of the nonwoven fabric is brought into contact with the net, and the melted thermoplastic resin (or thermoplastic synthetic fiber) of the net is brought into contact with the melted thermoplastic synthetic fiber and gets into among the fibers of the nonwoven fabric. As a result, the nonwoven fabric and the net are bonded (pressure-bonded). The melted thermoplastic synthetic fiber and the melted thermoplastic resin (or thermoplastic synthetic fiber) serve as binders (adhesives) for bonding the nonwoven fabric to the net.

After the thermal lamination, the melted thermoplastic synthetic fiber and the melted thermoplastic resin are solidified by cooling to be bonded integrally.

With this, the thermoplastic synthetic fiber of the nonwoven fabric solidified by cooling and the thermoplastic resin (or thermoplastic synthetic fiber) of the net solidified by cooling firmly integrate the nonwoven fabric and the net.

Thirdly, the netted nonwoven fabric is thermally pressure-bonded and shaped into a tubular bag.

The thermal pressure bonding of the nonwoven fabric and the net is performed by compressing the nonwoven fabric to the net with heating at up to the melting point equal to or higher than the glass transition point of the thermoplastic synthetic fiber (thermoplastic resin) to melt the thermoplastic synthetic fiber of the nonwoven fabric and the thermoplastic resin (or thermoplastic synthetic fiber) of the net.

The melted thermoplastic synthetic fiber and the melted thermoplastic resin are solidified by cooling to be bonded integrally.

Thus, the thermoplastic synthetic fiber of the nonwoven fabric solidified by cooling and the thermoplastic resin (or thermoplastic synthetic fiber) of the net solidified by cooling firmly integrate the nonwoven fabric and the net to maintain the product into a tubular bag.

The tubular bag is firmly integrated by the thermoplastic synthetic fiber solidified by cooling and the thermoplastic resin solidified by cooling.

Even when the tubular bag is stuffed with, for example, raw material meat (chunk of meat or kneaded meat) for ham, sausage, or the like in meat processing, breakage such as split is not caused because the tubular bag is formed by firmly integrating the nonwoven fabric and the net by thermal fusion bonding. The net of the tubular bag includes the thermoplastic synthetic fiber or the thermoplastic resin, and hence is deformed along with raw material meat and brought into close contact with the raw material meat together with the nonwoven fabric.

With this, in the tubular bag, the net exhibits a decoration effect. Further, even when the tubular bag is stuffed d with raw material meat, the net is not separated from the nonwoven fabric and is not mixed in the raw material meat.

In the eighth embodiment of the present invention, the nonwoven fabric and the net are preferably thermally laminated using a laminating machine to form the netted nonwoven fabric. In addition, the netted nonwoven fabric is preferably thermally pressure-bonded using a heat seal bag making machine to form the tubular bag.

With this, the tubular bag can be formed continuously, and an inexpensive packing material can be provided.

In the ninth embodiment of the present invention, the tubular material is shaped into a shirred form. For example, when the tubular material is filled with kneaded raw material meat for a processed meat product such as sausage using a continuous meat filling machine such as a double clipper, a processed meat product such as sausage can be shaped, packed, and produced.

Even when the tubular material is processed into a shirred form, the net is not separated from the nonwoven fabric because the nonwoven fabric and the net have been integrated by thermal lamination.

Further, when the tubular material having a shirred form is filled with, for example, kneaded raw material meat for a processed meat product, the net forms the kneaded raw material meat into a cylindrical shape (shape of sausage or the like) in cooperation with the nonwoven fabric and exhibits a decoration effect (mesh design). Further, even when the tubular material having a shirred form is filled with kneaded raw material meat, the net is not separated from the nonwoven fabric and is not mixed in the raw material meat.

In the ninth embodiment of the present invention, the tubular material is preferably shaped into a shirred form using a shirring machine.

With this, the tubular material can be continuously shaped into a shirred form to provide an inexpensive packing material.

In the tenth embodiment of the present invention, the netted food casing is used for shaping, packing, and producing processed food products, for example. Examples of the processed food products include a processed meat product, a processed fish product, and a processed dairy product. Examples of the processed meat product include ham, sausage, roast beef, roast pork, salami, and bacon. Examples of the processed fish product include fish sausage and fish ham. An example of the processed dairy product is cheese.

In the tenth embodiment of the present invention, firstly, the nonwoven fabric includes the thermoplastic synthetic fiber, and the net includes one of the plant fiber and the rayon fiber.

With this, the nonwoven fabric has a heat seal property as well as air permeability and water permeability.

Secondly, the nonwoven fabric and the net are thermally laminated.

In thermal lamination, the nonwoven fabric and the net are thermally pressure-bonded by compressing the nonwoven fabric and the net under heating at a melting point equal to or higher than the glass transition point of the thermoplastic synthetic fiber to melt the thermoplastic synthetic fiber of the nonwoven fabric. The melted thermoplastic synthetic fiber of the nonwoven fabric is brought into contact with the plant fiber (or rayon fiber) of the net by high compression or gets into among the plant fibers (or rayon fibers) to bond the nonwoven fabric to the net. The melted thermoplastic synthetic fiber of the nonwoven fabric serves as a binder (adhesive) for bonding the nonwoven fabric to the net.

After the thermal lamination, the melted thermoplastic synthetic fiber is solidified by cooling to be bonded integrally to the plant fiber (or rayon fiber) of the net.

With this, for example, in production of a processed meat product, even when the netted food casing is stuffed with raw material meat (chunk of meat or kneaded meat) for ham, sausage, or the like, the net is hardly separated from the nonwoven fabric and is not mixed in the raw material meat. Further, the net includes one of the plant fiber and the rayon fiber, and hence is deformed along with the raw material meat and brought into close contact with the raw material meat together with the nonwoven fabric to exhibit a decoration effect.

Further, in the tenth embodiment of the present invention, it is preferred that the net be laminated over the front surface of the nonwoven fabric to bring the reverse surface of the net into contact with the front surface of the nonwoven fabric, and the nonwoven fabric and the net be then highly compressed while being heated from the reverse surface of the nonwoven fabric to thermally laminate the nonwoven fabric and the net.

With this, the thermoplastic synthetic fiber of the nonwoven fabric can be melted without causing thermal deformation on the front surface side of the net to firmly pressure-bond the net to the nonwoven fabric and to exhibit a decoration effect of the net.

Further, in the tenth embodiment of the present invention, the nonwoven fabric and the net are preferably thermally laminated using a laminating machine. With this, the netted food casing can be formed continuously, and an inexpensive packing material can be provided.

BRIEF DESCRIPTION OF THE DRAWINGS

FIG. 2A is a view taken along the arrow A-A of FIG. 1, and FIG. 2B is an enlarged view of FIG. 2A.

FIG. 3A is a plan schematic view, and FIG. 3B is an enlarged perspective view.

FIG. 4A is a plan perspective view, and FIG. 4B is an enlarged partial sectional view taken along the arrow B-B of FIG. 4A.

FIG. 5A is a plan perspective view, and FIG. 5B is an enlarged partial sectional view taken along the arrow C-C of FIG. 5A.

FIG. 6A is a plan view of the front surface of the tubular bag, and FIG. 6B is a plan perspective view of the reverse surface of the tubular bag.

FIG. 8A is a front view, and FIG. 8B is a view taken along the arrow D-D of FIG. 8A.

FIG. 9A is a partial sectional view of a tubular material shaped into a shirred form using a shirring machine, and FIG. 9B is a partial sectional view of a tubular material filled with kneaded meat using a continuous meat filling machine such as a double clip.

FIG. 11A is a view taken along the arrow E-E of FIG. 10, and FIG. 11B is an enlarged view of FIG. 11A.

DETAILED DESCRIPTION OF THE PREFERRED EMBODIMENTS

A netted food casing according to the present invention is described with reference to FIG. 1 to FIG. 11.

In FIG. 1 to FIG. 11, a netted food casing X is widely used for packing food, in particular, for shaping, packing, and producing processed food products.

Examples of the processed food products include a processed meat product, a processed fish product, and a processed dairy product.

Examples of the processed meat product include ham, sausage, roast beef, roast pork, salami, bacon, and raw meat.

Examples of the processed fish product include fish sausage and fish ham. An example of the processed dairy product is cheese.

The netted food casing X serves as a netted casing for meat for a processed meat product, a netted casing for fish for a processed fish product, and a netted casing for a dairy product for a processed dairy product.

Figure 1:
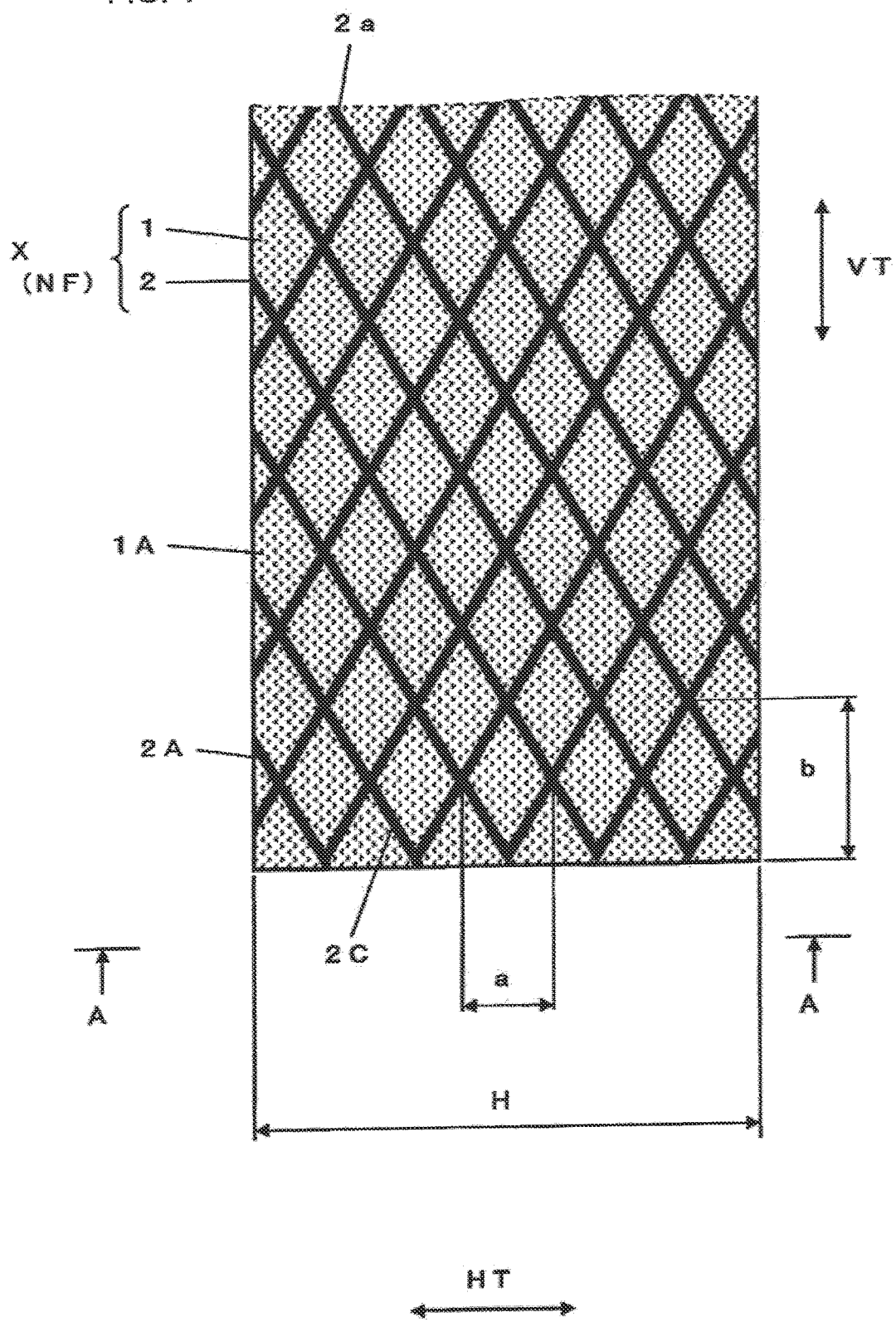
FIG. 1 is a plan view for illustrating a netted food casing (netted nonwoven fabric).
Figure 2A:
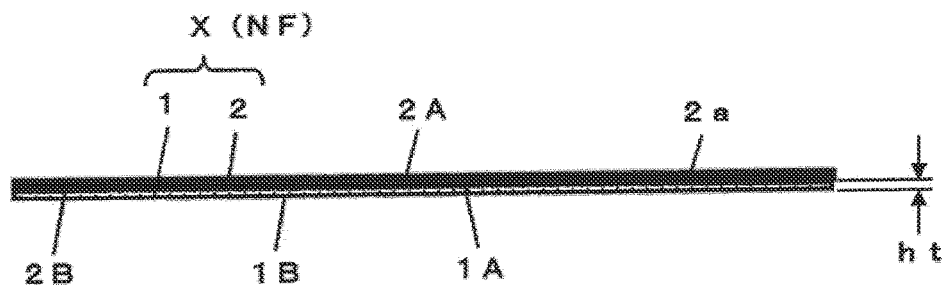
FIG. 2A and FIG. 2B are views for illustrating a netted food casing (netted nonwoven fabric).

As illustrated in FIG. 1 and FIG. 2, the netted food casing X includes a nonwoven fabric 1 and a net 2 and is formed by thermally laminating the nonwoven fabric 1 and the net 2.

As illustrated in FIG. 1 and FIG. 2, the nonwoven fabric 1 has a thickness ht and includes a thermoplastic synthetic fiber.

The thermoplastic synthetic fiber is a polyethylene fiber or a polyester fiber. The polyethylene fiber and the polyester fiber are formed of short fibers or long fibers.

The nonwoven fabric 1 has a heat seal property as well as air permeability and water permeability because the fabric includes the thermoplastic synthetic fiber.

As specific structures of the nonwoven fabric 1, nonwoven fabric structures A to F are adopted.

<Nonwoven Fabric Structure A>

The nonwoven fabric 1 includes 100 mass % of a polyethylene fiber.

<Nonwoven Fabric Structure B>

The nonwoven fabric 1 includes 100 mass % of a polyester fiber.

<Nonwoven Fabric Structure C>

The nonwoven fabric 1 includes a composite fiber including a polyethylene fiber and a plant fiber.

The plant fiber includes a cotton fiber, a hemp fiber, a pulp fiber, a rayon fiber, and the like.

The blend ratios (content ratios) between the polyethylene fiber and the plant fiber in terms of mass % are appropriately selected.

<Nonwoven Fabric Structure D>

The nonwoven fabric 1 includes a composite fiber including a polyester fiber and a plant fiber.

The plant fiber includes a cotton fiber, a hemp fiber, a pulp fiber, a rayon fiber, and the like.

The blend ratios (content ratios) between the polyester fiber and the plant fiber in terms of mass % are appropriately selected.

<Nonwoven Fabric Structure E>

The nonwoven fabric 1 includes a composite fiber including a polyethylene fiber and a polyester fiber.

The blend ratios (content ratios) between the polyethylene fiber and the polyester fiber in terms of mass % are appropriately selected.

The composite fiber including a polyethylene fiber and a polyester fiber may be, for example, a fiber having a core-clad structure including polyester as a core and polyethylene as a clad. The polyester fiber may be, for example, a fiber having a core-clad structure including polyester as a core and low melting point polyester as a clad.

<Nonwoven Fabric Structure F>

The nonwoven fabric 1 includes a composite fiber including a polyethylene fiber, a polyester fiber, and a plant fiber.

The plant fiber includes a cotton fiber, a hemp fiber, a pulp fiber, and the like.

The blend ratios (content ratios) between the polyethylene fiber, the polyester fiber, and the plant fiber in terms of mass % are appropriately selected.

The composite fiber including a polyethylene fiber and a polyester fiber may be, for example, a fiber having a core-clad structure including polyester as a core and polyethylene as a clad. The polyester fiber may be, for example, a fiber having a core-clad structure including polyester as a core and low melting point polyester as a clad.

The net 2 (mesh) includes one of a thermoplastic resin and a thermoplastic synthetic fiber. As illustrated in FIG. 1 and FIG. 2, the net 2 has a plurality of wire materials 2a, and the wire materials 2a form meshes 2C (mesh scale).

The thermoplastic resin is a polyethylene resin, a polyester resin, a polypropylene resin, or the like.

The thermoplastic synthetic fiber is a polyethylene fiber, a polyester fiber, a polypropylene fiber, or the like. The polyethylene fiber, the polyester fiber, and the polypropylene fiber are formed of short fibers or long fibers.

The net 2 has flexibility and a heat seal property because the net includes the thermoplastic resin or the thermoplastic synthetic fiber.

The net 2 may include a colored (black, white, red, green, yellow, blue, etc.) thermoplastic resin or a colored (black, white, red, green, yellow, blue, etc.) thermoplastic synthetic fiber.

The net 2 is formed by arranging rhombic meshes in a reticular pattern, for example. As the meshes of the net 2, there may be adopted square meshes, rectangular meshes, trapezoidal meshes, hexagonal meshes, and the like as well as the rhombic meshes.

As specific structures of the net 2, net structures a to j are adopted.

<Net Structure a>

The net 2 is formed by shaping wire materials made of a polyethylene resin into a mesh-like reticular pattern (molded mesh).

<Net Structure b>

The net 2 is formed by shaping wire materials made of a polyester resin into a mesh-like reticular pattern (molded mesh).

<Net Structure c>

The net 2 is formed by weaving wire materials (strings) made of a polyethylene fiber into a mesh-like reticular pattern (knotless net), or by tying wire materials (strings) made of a polyethylene fiber into a mesh-like reticular pattern (knotted net).

<Net Structure d>

The net 2 is formed by weaving wire materials (strings) made of a polyester fiber into a mesh-like reticular pattern (knotless net), or by tying wire materials (strings) made of a polyester fiber into a mesh-like reticular pattern (knotted net).

<Net Structure e>

The net 2 is formed by shaping wire materials made of a composite resin formed of a low melting point polyethylene resin (or low-density polyethylene resin) and a high melting point polyethylene resin (or high-density polyethylene resin) into a mesh-like reticular pattern (molded mesh).

The blend ratio between the low melting point polyethylene resin and the high melting point polyethylene resin in terms of mass % is appropriately selected.

<Net Structure f>

The net 2 is formed by weaving wire materials (strings) made of a composite fiber formed of a low melting point polyethylene fiber and a high melting point polyethylene fiber into a mesh-like reticular pattern (knotless net), or by tying wire materials made of the composite fiber into a mesh-like reticular pattern (knotted net).

The blend ratio between the low melting point polyethylene fiber and the high melting point polyethylene fiber in terms of mass % is appropriately selected.

<Net Structure g>

The net 2 is formed by shaping wire materials made of a composite resin formed of a low melting point polyester resin and a high melting point polyester resin into a mesh-like reticular pattern (molded mesh).

The blend ratio between the low melting point polyester resin and the high melting point polyester resin in terms of mass % is appropriately selected.

<Net Structure h>

The net 2 is formed by weaving wire materials (strings) made of a composite fiber formed of a low melting point polyester fiber and a high melting point polyester fiber into a mesh-like reticular pattern (knotless net), or by tying wire materials made of the composite fiber into a mesh-like reticular pattern (knotted net).

The blend ratio between the low melting point polyester fiber and the high melting point polyester fiber in terms of mass % is appropriately selected.

<Net Structure i>

The net 2 is formed by shaping wire materials made of a polypropylene resin into a mesh-like reticular pattern (molded mesh).

<Net Structure j>

The net 2 is formed by weaving wire materials made of a polypropylene fiber into a mesh-like reticular pattern (knotless net), or by tying wire materials made of the polypropylene fiber (strings) into a mesh-like reticular pattern (knotted net).

As specific combination patterns of the nonwoven fabric 1 and the net 2 in the netted food casing X, Combination Patterns 1 to 60 are adopted.

<Combination Pattern 1>

The netted food casing X includes the nonwoven fabric 1 having the "nonwoven fabric structure A" and the net 2 having the "net structure a."

<Combination Pattern 2>

The netted food casing X includes the nonwoven fabric 1 having the "nonwoven fabric structure A" and the net 2 having the "net structure b."

<Combination Pattern 3>

The netted food casing X includes the nonwoven fabric 1 having the "nonwoven fabric structure A" and the net 2 having the "net structure c."

<Combination Pattern 4>

The netted food casing X includes the nonwoven fabric 1 having the "nonwoven fabric structure A" and the net 2 having the "net structure d."

<Combination Pattern 5>

The netted food casing X includes the nonwoven fabric 1 having the "nonwoven fabric structure A" and the net 2 having the "net structure e."

<Combination Pattern 6>

The netted food casing X includes the nonwoven fabric 1 having the "nonwoven fabric structure A" and the net 2 having the "net structure f."

<Combination Pattern 7>

The netted food casing X includes the nonwoven fabric 1 having the "nonwoven fabric structure A" and the net 2 having the "net structure g."

<Combination Pattern 8>

The netted food casing X includes the nonwoven fabric 1 having the "nonwoven fabric structure A" and the net 2 having the "net structure h."

<Combination Pattern 9>

The netted food casing X includes the nonwoven fabric 1 having the "nonwoven fabric structure A" and the net 2 having the "net structure i."

<Combination Pattern 10>

The netted food casing X includes the nonwoven fabric 1 having the "nonwoven fabric structure A" and the net 2 having the "net structure j."

<Combination Pattern 11>

The netted food casing X includes the nonwoven fabric 1 having the "nonwoven fabric structure B" and the net 2 having the "net structure a."

<Combination Pattern 12>

The netted food casing X includes the nonwoven fabric 1 having the "nonwoven fabric structure B" and the net 2 having the "net structure b."

<Combination Pattern 13>

The netted food casing X includes the nonwoven fabric 1 having the "nonwoven fabric structure B" and the net 2 having the "net structure c."

<Combination Pattern 14>

The netted food casing X includes the nonwoven fabric 1 having the "nonwoven fabric structure B" and the net 2 having the "net structure d."

<Combination Pattern 15>

The netted food casing X includes the nonwoven fabric 1 having the "nonwoven fabric structure B" and the net 2 having the "net structure e."

<Combination Pattern 16>

The netted food casing X includes the nonwoven fabric 1 having the "nonwoven fabric structure B" and the net 2 having the "net structure f."

<Combination Pattern 17>

The netted food casing X includes the nonwoven fabric 1 having the "nonwoven fabric structure B" and the net 2 having the "net structure g."

<Combination Pattern 18>

The netted food casing X includes the nonwoven fabric 1 having the "nonwoven fabric structure B" and the net 2 having the "net structure h."

<Combination Pattern 19>

The netted food casing X includes the nonwoven fabric 1 having the "nonwoven fabric structure B" and the net 2 having the "net structure i."

<Combination Pattern 20>

The netted food casing X includes the nonwoven fabric 1 having the "nonwoven fabric structure B" and the net 2 having the "net structure j."

<Combination Pattern 21>

The netted food casing X includes the nonwoven fabric 1 having the "nonwoven fabric structure C" and the net 2 having the "net structure a."

<Combination Pattern 22>

The netted food casing X includes the nonwoven fabric 1 having the "nonwoven fabric structure C" and the net 2 having the "net structure b."

<Combination Pattern 23>

The netted food casing X includes the nonwoven fabric 1 having the "nonwoven fabric structure C" and the net 2 having the "net structure c."

<Combination Pattern 24>

The netted food casing X includes the nonwoven fabric 1 having the "nonwoven fabric structure C" and the net 2 having the "net structure d."

<Combination Pattern 25>

The netted food casing X includes the nonwoven fabric 1 having the "nonwoven fabric structure C" and the net 2 having the "net structure e."

<Combination Pattern 26>
The netted food casing X includes the nonwoven fabric 1 having the "nonwoven fabric structure C" and the net 2 having the "net structure f."
<Combination Pattern 27>
The netted food casing X includes the nonwoven fabric 1 having the "nonwoven fabric structure C" and the net 2 having the "net structure g."
<Combination Pattern 28>
The netted food casing X includes the nonwoven fabric 1 having the "nonwoven fabric structure C" and the net 2 having the "net structure h."
<Combination Pattern 29>
The netted food casing X includes the nonwoven fabric 1 having the "nonwoven fabric structure C" and the net 2 having the "net structure i."
<Combination Pattern 30>
The netted food casing X includes the nonwoven fabric 1 having the "nonwoven fabric structure C" and the net 2 having the "net structure j."
<Combination Pattern 31>
The netted food casing X includes the nonwoven fabric 1 having the "nonwoven fabric structure D" and the net 2 having the "net structure a."
<Combination Pattern 32>
The netted food casing X includes the nonwoven fabric 1 having the "nonwoven fabric structure D" and the net 2 having the "net structure b."
<Combination Pattern 33>
The netted food casing X includes the nonwoven fabric 1 having the "nonwoven fabric structure D" and the net 2 having the "net structure c."
<Combination Pattern 34>
The netted food casing X includes the nonwoven fabric 1 having the "nonwoven fabric structure D" and the net 2 having the "net structure d."
<Combination Pattern 35>
The netted food casing X includes the nonwoven fabric 1 having the "nonwoven fabric structure D" and the net 2 having the "net structure e."
<Combination Pattern 36>
The netted food casing X includes the nonwoven fabric 1 having the "nonwoven fabric structure D" and the net 2 having the "net structure f."
<Combination Pattern 37>
The netted food casing X includes the nonwoven fabric 1 having the "nonwoven fabric structure D" and the net 2 having the "net structure g."
<Combination Pattern 38>
The netted food casing X includes the nonwoven fabric 1 having the "nonwoven fabric structure D" and the net 2 having the "net structure h."
<Combination Pattern 39>
The netted food casing X includes the nonwoven fabric 1 having the "nonwoven fabric structure D" and the net 2 having the "net structure i."
<Combination Pattern 40>
The netted food casing X includes the nonwoven fabric 1 having the "nonwoven fabric structure D" and the net 2 having the "net structure j."
<Combination Pattern 41>
The netted food casing X includes the nonwoven fabric 1 having the "nonwoven fabric structure E" and the net 2 having the "net structure a."
<Combination Pattern 42>
The netted food casing X includes the nonwoven fabric 1 having the "nonwoven fabric structure E" and the net 2 having the "net structure b."
<Combination Pattern 43>
The netted food casing X includes the nonwoven fabric 1 having the "nonwoven fabric structure E" and the net 2 having the "net structure c."
<Combination Pattern 44>
The netted food casing X includes the nonwoven fabric 1 having the "nonwoven fabric structure E" and the net 2 having the "net structure d."
<Combination Pattern 45>
The netted food casing X includes the nonwoven fabric 1 having the "nonwoven fabric structure E" and the net 2 having the "net structure e."
<Combination Pattern 46>
The netted food casing X includes the nonwoven fabric 1 having the "nonwoven fabric structure E" and the net 2 having the "net structure f."
<Combination Pattern 47>
The netted food casing X includes the nonwoven fabric 1 having the "nonwoven fabric structure E" and the net 2 having the "net structure g."
<Combination Pattern 48>
The netted food casing X includes the nonwoven fabric 1 having the "nonwoven fabric structure E" and the net 2 having the "net structure h."
<Combination Pattern 49>
The netted food casing X includes the nonwoven fabric 1 having the "nonwoven fabric structure E" and the net 2 having the "net structure i."
<Combination Pattern 50>
The netted food casing X includes the nonwoven fabric 1 having the "nonwoven fabric structure E" and the net 2 having the "net structure j."
<Combination Pattern 51>
The netted food casing X includes the nonwoven fabric 1 having the "nonwoven fabric structure F" and the net 2 having the "net structure a."
<Combination Pattern 52>
The netted food casing X includes the nonwoven fabric 1 having the "nonwoven fabric structure F" and the net 2 having the "net structure b."
<Combination Pattern 53>
The netted food casing X includes the nonwoven fabric 1 having the "nonwoven fabric structure F" and the net 2 having the "net structure c."
<Combination Pattern 54>
The netted food casing X includes the nonwoven fabric 1 having the "nonwoven fabric structure F" and the net 2 having the "net structure d."
<Combination Pattern 55>
The netted food casing X includes the nonwoven fabric 1 having the "nonwoven fabric structure F" and the net 2 having the "net structure e."
<Combination Pattern 56>
The netted food casing X includes the nonwoven fabric 1 having the "nonwoven fabric structure F" and the net 2 having the "net structure f."
<Combination Pattern 57>
The netted food casing X includes the nonwoven fabric 1 having the "nonwoven fabric structure F" and the net 2 having the "net structure g."
<Combination Pattern 58>
The netted food casing X includes the nonwoven fabric 1 having the "nonwoven fabric structure F" and the net 2 having the "net structure h."

<Combination Pattern 59>

The netted food casing X includes the nonwoven fabric 1 having the "nonwoven fabric structure F" and the net 2 having the "net structure i."

<Combination Pattern 60>

The netted food casing X includes the nonwoven fabric 1 having the "nonwoven fabric structure F" and the net 2 having the "net structure j."

Figure 2B:
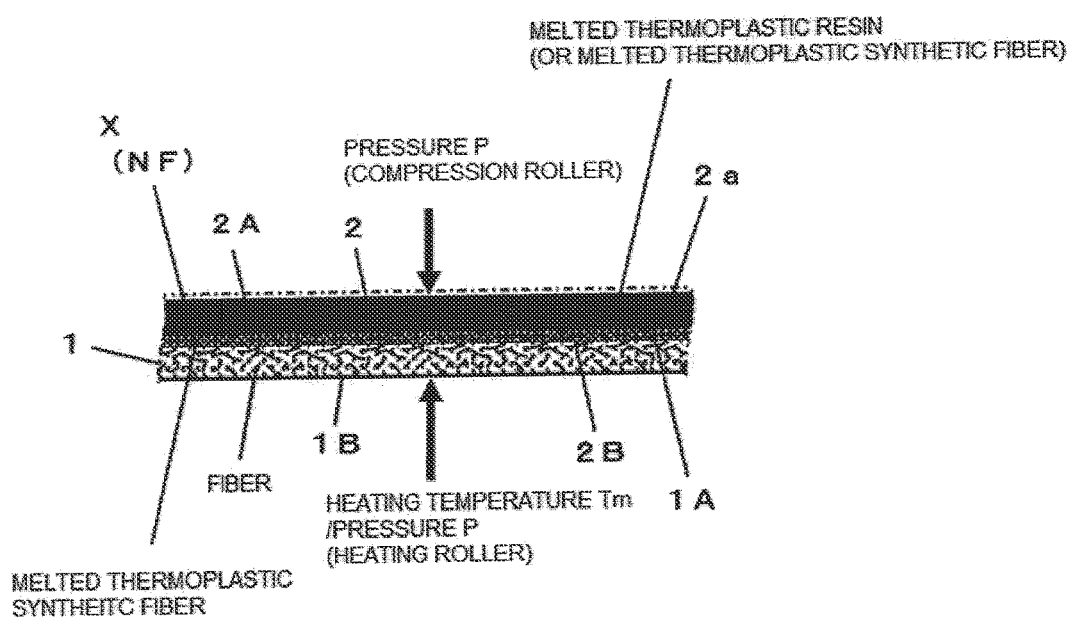
Figure 3A:
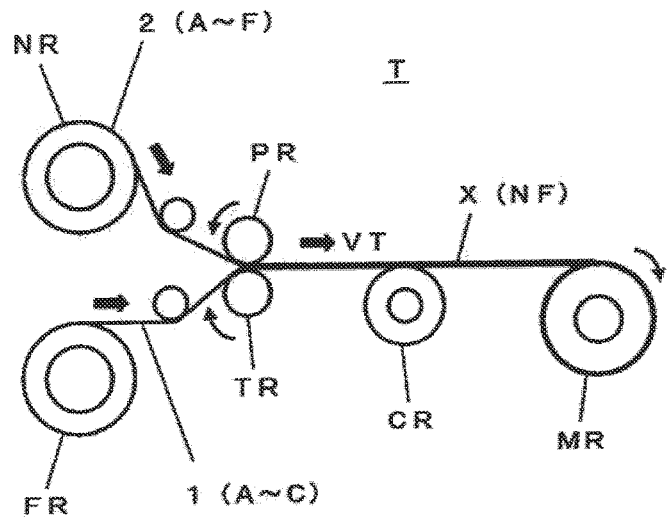
FIG. 3A and FIG. 3B are views for illustrating a laminating machine.
Figure 3B:
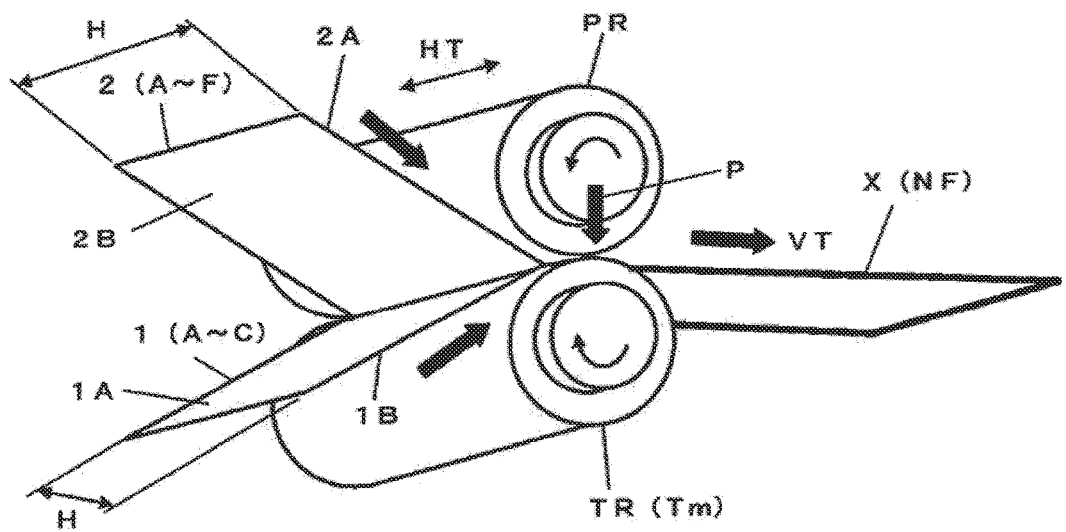

As illustrated in FIG. 1 to FIG. 3, the netted food casing X is formed by thermally laminating the nonwoven fabric 1 and the net 2 of <Combination Patterns 1 to 60>.

In the netted food casing X, the nonwoven fabric 1 and the net 2 are thermally laminated to form a netted nonwoven fabric NF (netted nonwoven fabric sheet).

A step of producing the netted food casing X is described below with reference to FIG. 1 to FIG. 3.

In thermal lamination, the nonwoven fabric 1 and the net 2 are laminated (hereinafter referred to as "lamination step").

As illustrated in FIG. 1 and FIG. 2, in the lamination step, the net 2 is laminated over a front surface 1A of the nonwoven fabric 1 to bring the front surface 1A of the nonwoven fabric 1 into contact with a reverse surface 2B of the net 2.

In thermal lamination, the nonwoven fabric 1 and the net 2 are heated at a melting point (hereinafter referred to as "heating temperature Tm") equal to or higher than the glass transition point of the thermoplastic fiber (or thermoplastic synthetic fiber) (hereinafter referred to as "heating step").

As illustrated in FIG. 2B, in the heating step, the nonwoven fabric 1 and the net 2 are heated from a reverse surface 1B of the nonwoven fabric 1 to melt the thermoplastic synthetic fiber of the nonwoven fabric 1 and the thermoplastic resin (or thermoplastic synthetic fiber) on the reverse surface 2B side of the net 2.

The heating temperature Tm varies depending on <Combination Patterns 1 to 60>, and may be a melting point of the polyethylene resin (or polyethylene fiber) or the polyester resin (or polyester fiber) contained in the nonwoven fabric 1 or the net 2, a melting point of the low melting point polyethylene resin (or low melting point polyethylene fiber) or the low melting point polyester resin (or low melting point polyester fiber) contained in the net 2, or a melting point of the polypropylene resin (or polypropylene fiber) contained in the net 2. The heating temperature Tm is a melting point at which one or a plurality of kinds of thermoplastic resins (or thermoplastic synthetic fibers) can be melted.

In the heating step, when the nonwoven fabric 1 and the net 2 are heated from the reverse surface 1B of the nonwoven fabric 1, the net on a front surface 2A side is hardly melted.

With this, the net 2 on the front surface 2A side can maintain its net shape because deformation and melting due to heating are suppressed.

In the heating step, the time tm for heating the nonwoven fabric 1 and the net 2 is the time in which the thermoplastic synthetic fiber of the nonwoven fabric 1 and the thermoplastic resin (or thermoplastic fiber) on the reverse surface 2B side of the net 2 can be melted, while the net 2 on the front surface 2A side is not deformed and melted by heating. The time tm is appropriately selected depending on the kinds and the blend ratio in terms of mass % of the thermoplastic resin and the thermoplastic synthetic fiber, the thickness ht of the nonwoven fabric 1, the size of wire materials 2a of the net 2, the mesh size, the mesh pitch, etc.

Thermal lamination is performed by compression of the nonwoven fabric 1 and the net 2 at a pressure P (hereinafter referred to as "compression step").

As illustrated in FIG. 2B, in the compression step, the front surface 1A of the nonwoven fabric 1 and the front surface 2A of the net 2 are pressure-bonded.

In the compression step, when the nonwoven fabric 1 and the net 2 are compressed at a pressure P, as illustrated in FIG. 2B, the melted thermoplastic synthetic fiber of the nonwoven fabric 1 is brought into contact with the net 2 on the reverse surface 2B side. Further, the melted thermoplastic resin (or thermoplastic synthetic fiber) of the net 2 is brought into contact with the melted thermoplastic synthetic fiber of the nonwoven fabric 1 and gets into among the fibers of the nonwoven fabric 1. As a result, the nonwoven fabric 1 is bonded to the net 2. The melted thermoplastic synthetic fiber and the melted thermoplastic resin serve as binders (adhesives) for bonding the nonwoven fabric 1 to the net 2.

The pressure P in the compression step is a pressure that is sufficient for pressure bonding of the nonwoven fabric 1 to the net 2 and does not cause collapse or deformation of the net 2, and is appropriately selected based on the kinds and the blend ratio in terms of mass % of the thermoplastic resin and the thermoplastic synthetic fiber, the thickness ht of the nonwoven fabric 1, the size of the wire materials 2a of the net 2, the mesh size, the mesh pitch, etc.

The compression step is performed simultaneously with the heating step to compress the nonwoven fabric 1 and the net 2 at a pressure P under heating at a heating temperature Tm.

After thermal lamination, the nonwoven fabric 1 and the net 2 are cooled (hereinafter referred to as "cooling step").

In the cooling step, the melted thermoplastic synthetic fiber and the melted thermoplastic resin are solidified by cooling to be integrally bonded.

The net 2 on the whole reverse surface 2B side adheres firmly to the front surface 1A of the nonwoven fabric 1, and the whole is integrated with the thermoplastic synthetic fiber solidified by cooling and the thermoplastic resin (or thermoplastic synthetic fiber) solidified by cooling.

With this, a netted nonwoven fabric NF including the nonwoven fabric 1 and the net 2 is formed.

The netted nonwoven fabric NF has a structure in which the net 2 is hardly separated from the nonwoven fabric 1 and is bonded firmly to the nonwoven fabric 1 because the whole reverse surface 2B of the net 2 has been integrated with (bonded to) the front surface 1A of the nonwoven fabric 1.

As illustrated in FIG. 3, the nonwoven fabric 1 and the net 2 are thermally laminated using a laminating machine T.

Further, the laminating machine T is used in the lamination step, the heating step, the compression step, and the cooling step.

As illustrated in FIG. 3, the nonwoven fabric 1 and the net 2 are thermally laminated using a laminating machine T.

Further, the laminating machine T is used in the lamination step, the heating step, the compression step, and the cooling step.

As illustrated in FIG. 3, the laminating machine T includes a nonwoven fabric roll FR, a net roll NR, a heating roller TR, a compression roller PR, a cooling roller CR, and a take-up roll MR.

The nonwoven fabric roll FR is formed by rolling the nonwoven fabric 1 having a band shape with a constant width H. The net roll NR is formed by rolling the net 2 having a belt shape with a constant width H.

The heating roller TR is arranged downstream of the nonwoven fabric roll FR and the net roll NR, and is used for heating the nonwoven fabric 1 and the net 2 at a heating temperature Tm. The heating roller TR is brought into line contact with the reverse surface 1B of the nonwoven fabric 1 in the width direction HT of the nonwoven fabric 1.

The compression roller PR is arranged downstream of the nonwoven fabric roll FR and the net roll NR, and is used for compressing the net 2 and the nonwoven fabric 1 to the heating roller TR at a linear pressure P. The compression roller PR is brought into line contact with the front surface 2A of the net 2 in the width direction HT of the net 2, and the nonwoven fabric 1 and the net 2 are compressed at the linear pressure P.

The cooling roller CR is arranged downstream of the heating roller TR and the compression roller PR and is brought into contact with the reverse surface 1B of the nonwoven fabric 1. The take-up roll MR is arranged downstream of the cooling roller CR.

In the laminating machine T, the heating roller TR and the compression roller PR rotate to feed the nonwoven fabric 1 of the nonwoven fabric roll FR and the net 2 of the net roll NR to between the rollers TR and PR along with the rotation of the rollers TR and PR. The heating roller TR and the compression roller PR deliver the nonwoven fabric 1 and the net 2 at a feeding rate V in a feeding direction VT perpendicular to the width direction H.

The net 2 fed to between the rollers TR and PR is laminated over the front surface 1A of the nonwoven fabric 1. The net 2 and the nonwoven fabric 1 are laminated so that the reverse surface 2B of the net 2 is brought into contact with the front surface 1A of the nonwoven fabric 1 (lamination step).

The heating roller TR is used for heating the nonwoven fabric 1 and the net 2 at a heating temperature Tm to melt the thermoplastic synthetic fiber of the nonwoven fabric 1 and the thermoplastic resin (or thermoplastic synthetic fiber) of the net 2 on the reverse surface 2B side (heating step).

Simultaneously with the heating step, the compression roller PR is used to compress the net 2 and the nonwoven fabric 1 to the heating roller TR at a linear pressure P (compression step).

Thus, the front surface 1A of the nonwoven fabric 1 and the net 2 on the reverse surface 2B side are pressure-bonded. In this step, the melted thermoplastic synthetic fiber of the nonwoven fabric 1 is brought into contact with the net 2 on the reverse surface 2B side, and the melted thermoplastic resin (or thermoplastic synthetic fiber) of the net 2 on the reverse surface 2B side is brought into contact with the melted thermoplastic synthetic fiber and gets into among the fibers of the nonwoven fabric 1. With this, the nonwoven fabric 1 is bonded to the net 2.

In the laminating machine T, the rotation rates of the heating roller TR and the compression roller PR are controlled to adjust the feeding rate V of the nonwoven fabric 1 and the net 2. The feeding rate V corresponds to a time for bringing the nonwoven fabric 1 and the net 2 into contact with the heating roller TR and the compression roller PR and corresponds to a heating time tm.

The heating roller TR and the compression roller PR are used for feeding the nonwoven fabric 1 and the net 2 to the cooling roller CR. The nonwoven fabric 1 and the net 2 are brought into contact with the cooling roller CR and cooled (cooling step).

In this step, the melted thermoplastic resin (or thermoplastic synthetic fiber) on the reverse surface 2B side of the net 2 and the melted thermoplastic fiber of the nonwoven fabric 1 are solidified by cooling to be bonded integrally.

Thus, the nonwoven fabric 1 and the net 2 are integrated with the thermoplastic synthetic fiber and thermoplastic resin solidified by cooling to form the netted nonwoven fabric NF.

The netted nonwoven fabric NF (band-like netted nonwoven fabric sheet) is fed from the cooling roller CR to the take-up roll MR. The take-up roll MR is used for taking up the netted nonwoven fabric NF.

When the nonwoven fabric 1 and the net 2 are thermally laminated using the laminating machine T as described above, the netted nonwoven fabric NF serving as a netted food casing X can be formed continuously, and hence an inexpensive packing material can be provided.

While the netted food casing X adopts <Combination Pattern 1> to <Combination Pattern 60>, the netted food casing X particularly preferably includes the nonwoven fabric 1 and the net including the same thermoplastic resin (or thermoplastic synthetic fiber) in combination.

Specific usage patterns 1 and 2 of the netted food casing X are described below with reference to FIG. 1 and FIG. 4 to FIG. 9.

<Usage Pattern 1>

Figure 4A:
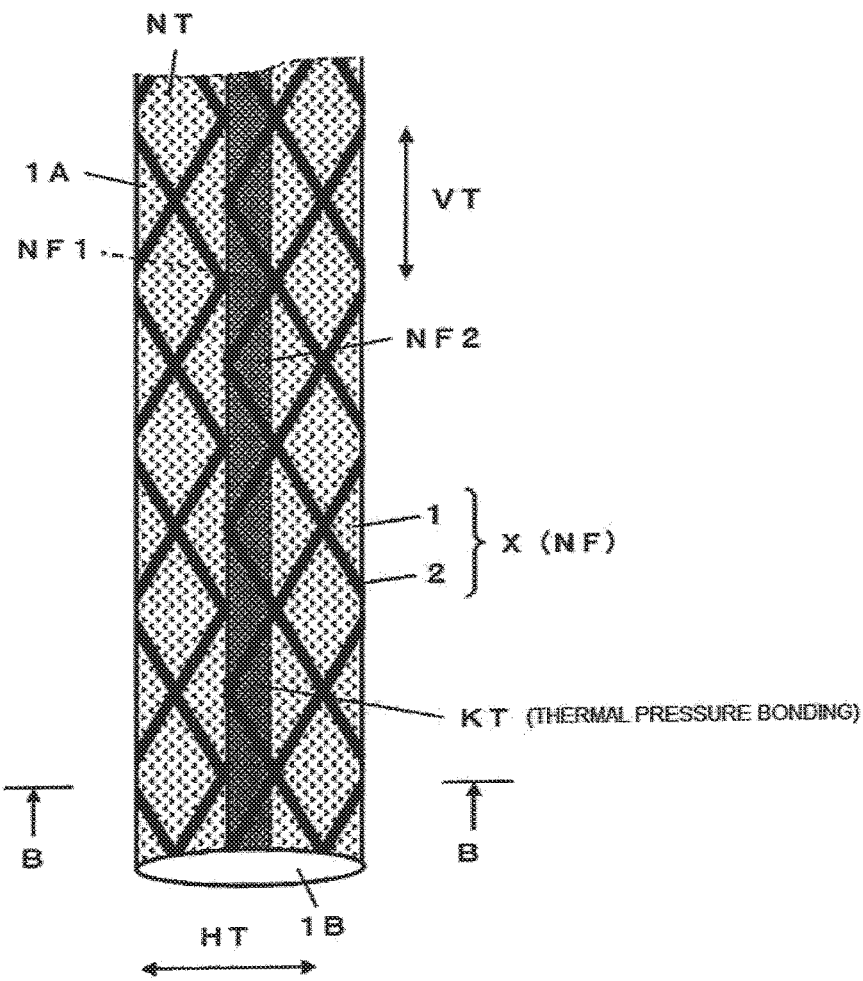
FIG. 4A and FIG. 4B are views for illustrating a netted food casing (tubular material).
Figure 5A:
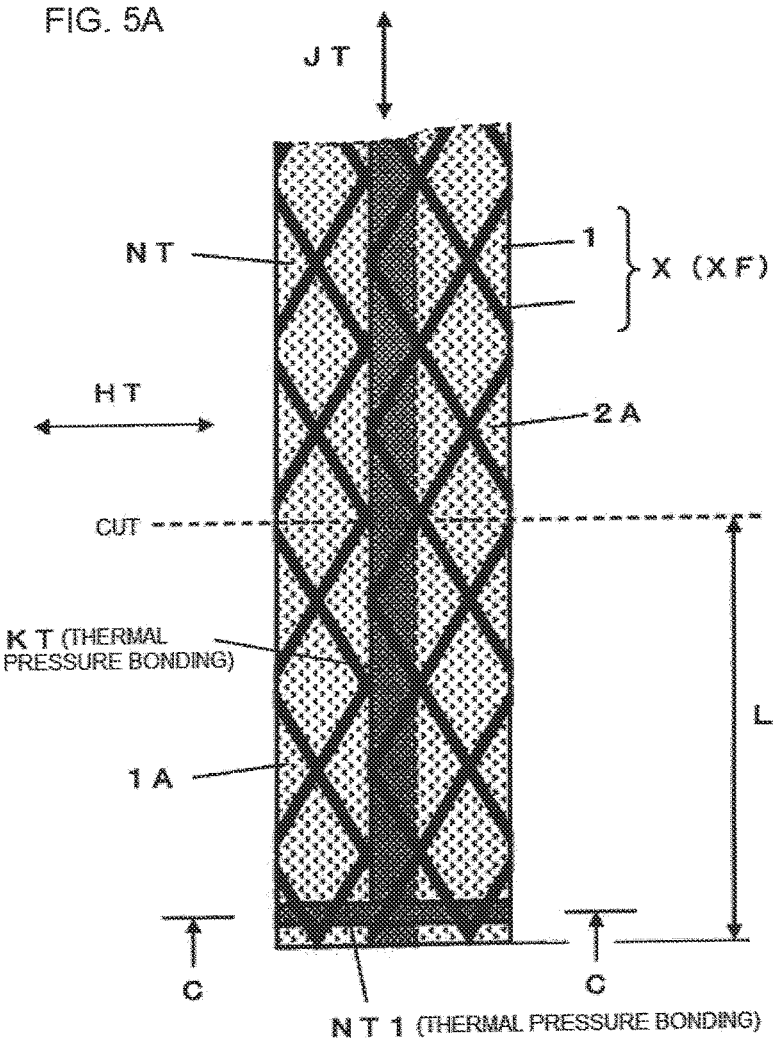
FIG. 5A and FIG. 5B are views for illustrating a netted food casing (tubular bag before cutting).
Figure 5B:
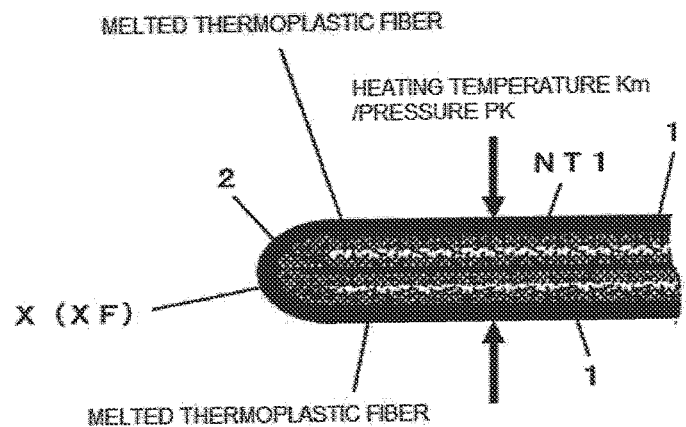
Figure 6A:
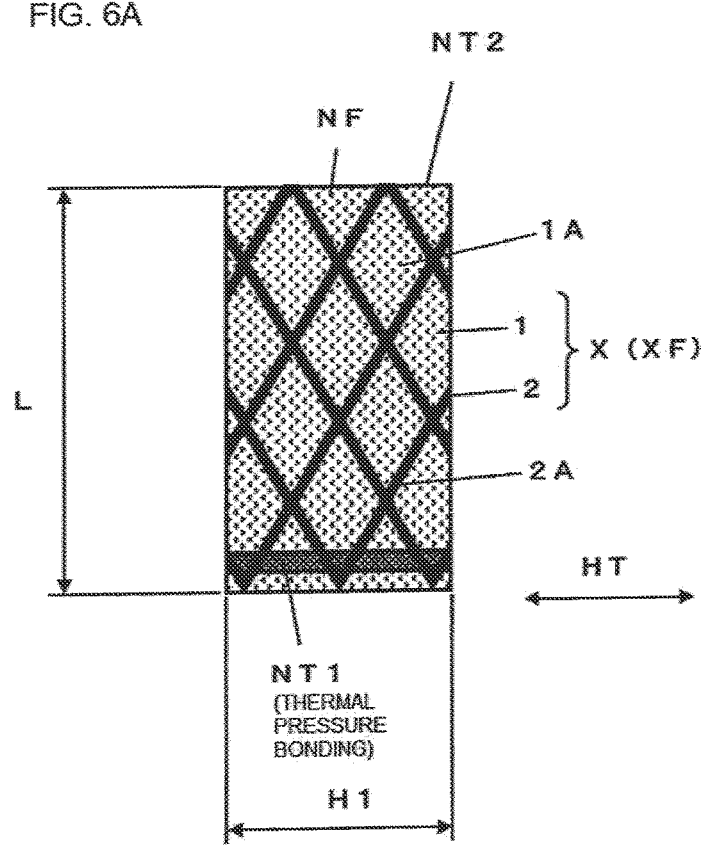
FIG. 6A and FIG. 6B are views for illustrating a netted food casing (tubular bag).
Figure 6B:
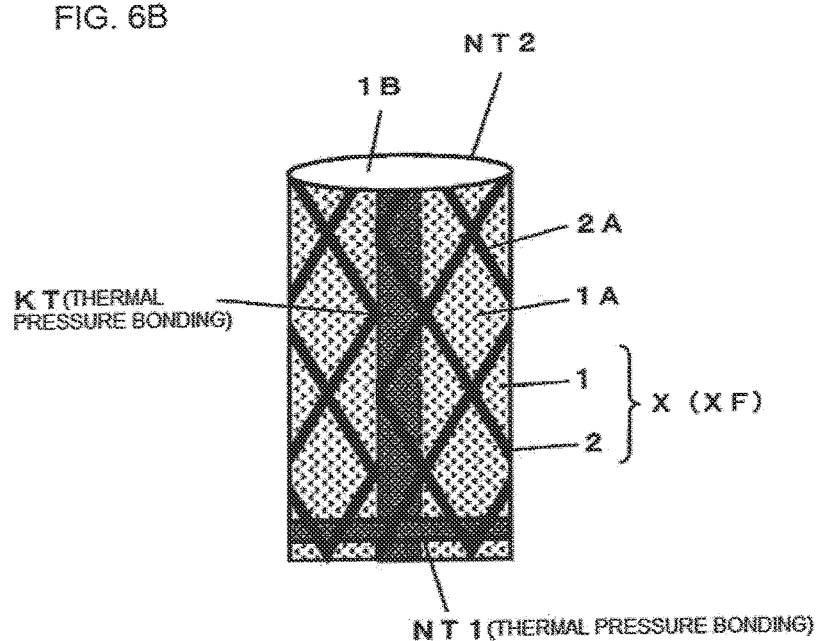

As illustrated in FIG. 4 to FIG. 6, the netted nonwoven fabric NF in the netted food casing X is shaped into a tubular bag XF by thermal pressure bonding.

A step of producing the tubular bag XF is described below.

First, as illustrated in FIG. 1, the tubular bag XF is formed of the band-like netted nonwoven fabric NF at a constant width H.

As illustrated in FIG. 4, the netted nonwoven fabric NF is folded (hereinafter referred to as "folding step").

In the folding step, both ends NF1 and NF2 in the width direction HT of the netted nonwoven fabric NF are folded on the reverse surface 1B side of the nonwoven fabric 1, and the both ends NF1 and NF2 are overlapped.

Thus, the netted nonwoven fabric NF is shaped into a tubular material NT, and the net 2 is arranged on the outer side (outer periphery) of the tubular material NT (see FIG. 4).

As illustrated in FIG. 4, the both sides NF1 and NF2 of the netted nonwoven fabric NF are overlapped in a vertical direction VT perpendicular to the width direction HT to form an overlapped region KT.

Next, the overlapped region KT in the netted nonwoven fabric NF of the tubular material NT is thermally pressure-bonded (hereinafter referred to as "vertical thermal pressure bonding step").

In the vertical thermal pressure bonding step, the net 2 and the nonwoven fabric 1 in the overlapped region KT are heated at a heating temperature Km, while the nonwoven fabric 1 and the net 2 are compressed at a pressure PK.

Figure 4B:
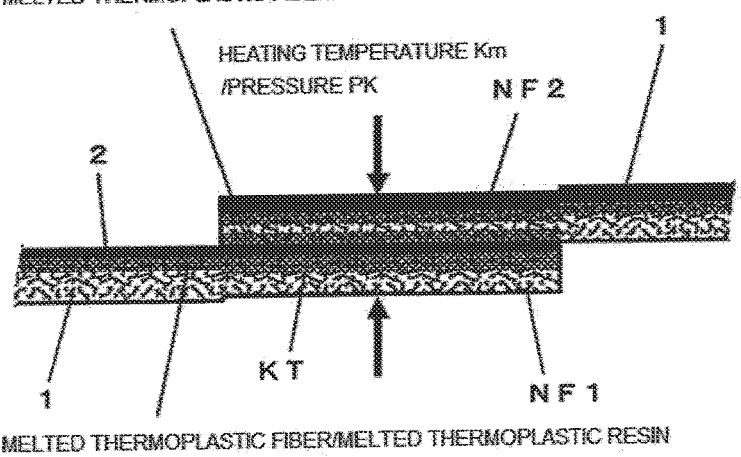

As illustrated in FIG. 4B, in the vertical thermal pressure bonding step, the nonwoven fabric 1 and the net 2 in the overlapped region KT are heated from the net 2 side of the tubular material NT to melt the thermoplastic synthetic fiber of the nonwoven fabric 1 and the thermoplastic resin (or thermoplastic synthetic fiber) of the net 2.

The heating temperature Km is a melting point equal to or higher than the glass transition point of the thermoplastic synthetic fiber (or thermoplastic resin) and varies depending on <Combination Patterns 1 to 60> described above. The heating temperatures Km in the cases of <Combination Patterns 1 to 60> are the same as those described in the heating step of thermal lamination.

In the vertical thermal pressure bonding step, the nonwoven fabric 1 and the net 2 in the overlapped region KT are compressed at a pressure PK simultaneously with heating.

In the vertical thermal pressure bonding step, when the nonwoven fabric 1 and the net 2 in the overlapped region KT are compressed at a pressure PK, as illustrated in FIG. 4B, the thermoplastic synthetic fiber melted at one end NF1 of the nonwoven fabric 1 is brought into contact with the net 2 located between the both ends NF1 and NF2 and gets into among the fibers of the other end NF2 with being in contact with the melted thermoplastic synthetic fiber. The thermoplastic fiber melted at the other end NF2 of the nonwoven fabric 1 is brought into contact with the net 2 located between the both ends NF1 and NF2 and gets into among the fibers of the one end NF1 with being in contact with the melted thermoplastic synthetic fiber. The melted thermoplastic resin (or thermoplastic synthetic fiber) of the net 2 located between the both ends NF1 and NF2 gets into among the fibers of the both ends NF1 and NF2.

Thus, the both ends NF1 and NF2 of the nonwoven fabric 1 are pressure-bonded with the melted thermoplastic synthetic fibers and the melted thermoplastic resin in the overlapped region KT.

Subsequently, in the netted nonwoven fabric NF, the one axial end NT1 of the tubular material NT is thermally pressure-bonded (hereinafter referred to as "horizontal thermal pressure bonding step").

As illustrated in FIG. 5, in the horizontal thermal pressure bonding step, the nonwoven fabric 1 and the net 2 are heated at a heating temperature Km in the width direction HT perpendicular to the axial direction JT of the tubular material NT to melt the thermoplastic synthetic fiber of the nonwoven fabric 1 and the thermoplastic resin (or thermoplastic synthetic fiber) of the net 2.

In the horizontal thermal pressure bonding step, the nonwoven fabric 1 and the net 2 are compressed at a pressure PK at the one axial end NT1 of the tubular material NT simultaneously with heating.

As illustrated in FIG. 5B, at the one axial end NT1 of the tubular material NT, the netted nonwoven fabric NF is overlapped one on the other, and the melted thermoplastic synthetic fiber of the lower nonwoven fabric 1 is brought into contact with the melted thermoplastic synthetic fiber and gets into among the fibers of the upper nonwoven fabric 1. The melted thermoplastic synthetic fiber of the upper nonwoven fabric 1 is brought into contact with the melted thermoplastic synthetic fiber and gets into among the fibers of the lower nonwoven fabric 1.

With this, the upper and lower nonwoven fabrics 1, 1 are bonded to each other with the melted thermoplastic synthetic fiber at the one axial end NT1 of the tubular material NT.

After the horizontal thermal pressure bonding step, the tubular material NT is cut (hereinafter referred to as "cutting step").

As illustrated in FIG. 5A and FIG. 6, in the cutting step, the tubular material NT is cut at a position separated by the length L away from the one axial end NT1 of the tubular material NT in the axial direction JT of the tubular material NT.

The tubular material NT is cut in the width direction HT.

Thus, as illustrated in FIG. 6, the netted nonwoven fabric NF is shaped into the tubular bag XF.

Then, when the tubular bag XF is naturally cooled, the melted thermoplastic synthetic fiber of the nonwoven fabric 1 and the melted thermoplastic resin (or thermoplastic synthetic fiber) of the net 2 are solidified by cooling to be bonded integrally.

With this, in the tubular bag XF, the nonwoven fabric 1 and the net 2 are integrated with the thermoplastic synthetic fiber and thermoplastic resin (or thermoplastic synthetic fiber) solidified by cooling in the overlapped region KT and at the one axial end NT1, and hence are hardly separated and firmly bonded.

Figure 7:
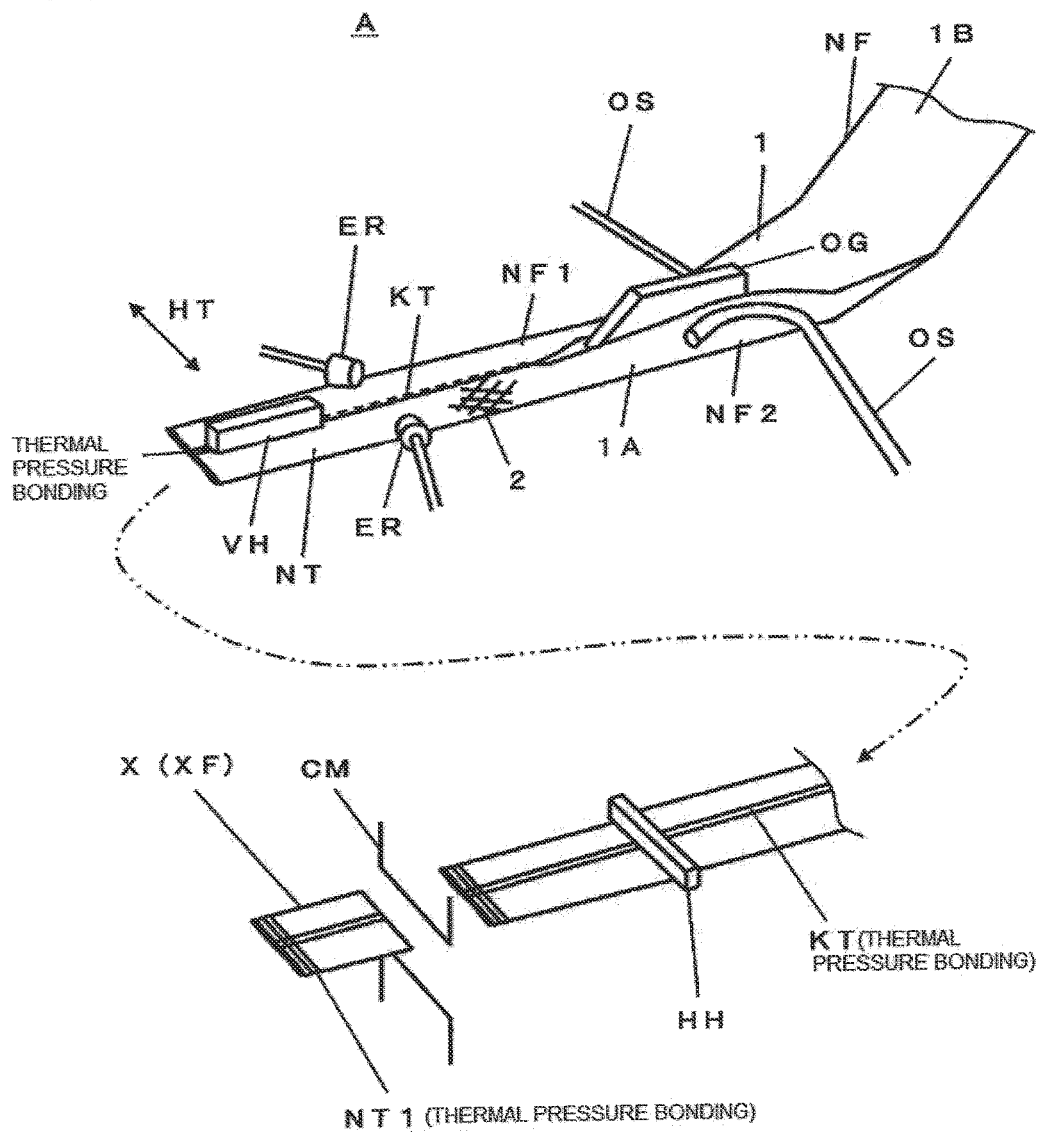
FIG. 7 is a perspective view for illustrating a heat sealing bag making machine.

As illustrated in FIG. 7, the netted nonwoven fabric NF is thermally pressure-bonded using a center press seal bag making machine A.

The center press seal bag making machine A is used to perform the folding step, the vertical thermal pressure bonding step, the horizontal thermal pressure bonding step, and the cutting step.

In FIG. 7, the center press seal bag making machine A is equipped with a pair of folding bars OS, OS, a folding guide OG, a pair of conical rollers ER, ER, a vertical thermal pressure bonding device VH, a horizontal thermal pressure bonding device HH, a cutting machine CM, and the like.

As illustrated in FIG. 7, in the center press seal bag making machine A, the band-like netted nonwoven fabric NF having a constant width H is fed to between the folding bars OS, OS with the reverse surface 1B of the nonwoven fabric 1 facing up. The folding guide OG is located between the folding bars OS, OS and is arranged on the reverse surface 1B of the nonwoven fabric 1.

In the center press seal bag making machine A, the netted nonwoven fabric NF is fed to between the folding bars OS, OS to bring the nonwoven fabric on the net 2 side (the front surface 1A side of the nonwoven fabric 1) into abutment with the folding bars OS, OS. The netted nonwoven fabric NF is brought into abutment with the folding bars OS, OS on the both end NF1 and NF2 sides in the width direction HT.

The folding bars OS, OS are used to fold the netted nonwoven fabric NF on the both end NF1 and NF2 sides on the reverse surface 1B of the nonwoven fabric 1 to bring the netted nonwoven fabric NF into abutment with the folding guide OG.

Subsequently, the netted nonwoven fabric NF is folded by the conical rollers ER, ER to make a line on the downstream side of the folding guide OG to form an overlapped region KT (folding step).

With this, the netted nonwoven fabric NF is shaped into a tubular material NT, and the tubular material NT is fed to the vertical thermal pressure bonding device VH and the horizontal thermal pressure bonding device HH.

The vertical thermal pressure bonding device VH is used for thermal pressure bonding of the overlapped region KT (vertical thermal pressure bonding step), and the horizontal thermal pressure bonding device HH is used for thermal pressure bonding of the one axial end NT1 of the tubular material NT (horizontal thermal pressure bonding step).

Subsequently, the tubular material NT (netted nonwoven fabric NF) is cut with a cutting machine CM (cutting step).

With this, the netted nonwoven fabric NF is shaped into a tubular bag XF (netted food casing X).

Thus, when the netted nonwoven fabric NF is thermally pressure-bonded using the center press seal bag making machine A, the tubular bag XF that is a netted food casing X can be formed continuously to provide an inexpensive packing material.

The tubular bag XF (netted food casing X) is stuffed with raw material meat (chunk of meat) for ham, bacon, or the like, for example, to shape, pack, and produce a processed meat product. After stuffing of the tubular bag XF with raw material meat, the opening axis end NT2 of the tubular bag XF (see FIG. 6) is closed by thermal pressure bonding.

Thermal pressure bonding of the opening axis end NT2 of the tubular bag XF is performed at a heating temperature Km and a pressure PK, which are almost the same as those in thermal pressure bonding (horizontal thermal pressure bonding step) of the one axial end NT1 of the tubular material NT.

As illustrated in FIG. 6, the tubular bag XF is formed by integrating the front surface 1A (outer periphery of the tubular bag XF) of the nonwoven fabric 1 with the net 2, and the net 2 is made of a thermoplastic resin (or thermoplastic synthetic fiber).

With this, when the tubular bag XF is stuffed with raw material meat, the net 2 is elastically deformed along with the shape of the raw material meat and is brought into close contact with the surface of the raw material meat together with the nonwoven fabric 1. In the tubular bag XF, the nonwoven fabric 1 and the net 2 are brought into close contact with the raw material meat and hence maintain the shape of the raw material meat in cooperation, and the net 2 exhibits a decoration effect (mesh design).

Even when the tubular bag XF is stuffed with the raw material meat, the net 2 is not separated from the nonwoven fabric 1 and is not mixed in the raw material meat.

Subsequently, the tubular bag XF stuffed with the raw material meat is dried and smoked. The smoking step is performed by smoking the raw material meat with smoke of cherry wood chips or the like to improve preservation stability and to give a decoration color, flavor, and taste to the raw material meat. In this step, in the tubular bag XF (netted food casing X), the raw material meat is wrapped with the nonwoven fabric 1, and hence the smoke is brought into contact with the raw material meat through among the fibers of the nonwoven fabric 1.

Further, the net 2 has been integrated with the front surface 1A of the nonwoven fabric 1 and is not brought into contact with the raw material meat, and hence the smoke is brought into contact with the raw material meat through among the fibers of the nonwoven fabric 1 even in a part in which the net 2 and the nonwoven fabric 1 have been integrated with (bonded to) each other.

With this, in the tubular bag XF (netted food casing X), the smoke can be brought into contact with the whole (entire surface) of the raw material meat to suppress unevenness of decoration coloring, flavoring, and seasoning caused by the smoke.

After smoking, the tubular bag XF stuffed with the raw material meat is steamed. The steaming step is performed to heat-sterilize the raw material meat through with hot water or steam.

In the tubular bag XF (netted food casing X), the net 2 has been integrated with the front surface 1A of the nonwoven fabric 1, and hence, as in the case of the smoking step, the steam or the like is brought into contact with the raw material meat through among the fibers of the nonwoven fabric 1. Even in a part in which the nonwoven fabric 1 and the net 2 has been integrated with each other, the steam or the like is brought into contact with the raw material meat through among the fibers of the nonwoven fabric 1.

Thus, the raw material meat in the tubular bag 1 can be sufficiently heated and sterilized to the inside.

It should be noted that, for raw material meat for ham, bacon, or the like, the smoking step or the steaming step is appropriately selected, if necessary.

The tubular bag XF stuffed with the raw material meat is subjected to a cooling step, a secondary packing step, and the like, and is shipped as a processed meat product. In the secondary packing step, the tubular bag XF stuffed with the raw material meat is vacuum-packed, and during the vacuum-packing, the nonwoven fabric 1 absorbs moisture and becomes transparent. With this, the raw material meat (smoked and steamed material meat) stuffed can be visually observed through the transparent nonwoven fabric 1.

It should be noted that the tubular bag XF may be stuffed with raw material fish paste for a processed fish product or raw material curd for a processed dairy product to shape, pack, and produce a processed fish product such as fish sausage or fish ham, or a processed dairy product such as cheese.

<Usage Pattern 2>

In the netted food casing X, the netted nonwoven fabric NF is shaped into a tubular material NT by thermal pressure bonding. The netted nonwoven fabric NF shaped into the tubular material NT is shaped into a shirred form.

First, as illustrated in FIG. 1, the tubular material NT is formed of the nonwoven fabric 1 having a band shape with a constant width H.

As illustrated in FIG. 4, as in the case of Usage pattern 1, the tubular material NT is subjected to the folding step and the vertical thermal pressure bonding step. Then, in the overlapped region KT, the net 2 and the nonwoven fabric 1 are heated at a heating temperature Km while the nonwoven fabric 1 and the net 2 are compressed.

In the vertical thermal pressure bonding step, the nonwoven fabric 1 and the net 2 in the overlapped region KT are compressed at a pressure PK to pressure-bond the nonwoven fabric 1 and the net 2. As a result, a tubular material NT is formed.

Figure 8A:
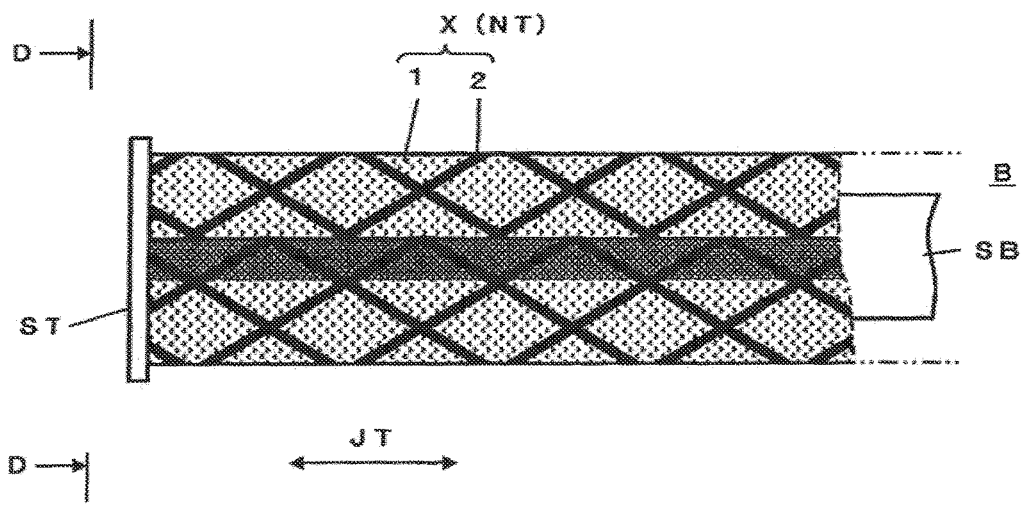
FIG. 8A and FIG. 8B are drawings for illustrating a netted food casing and a shirring machine.
Figure 8B:
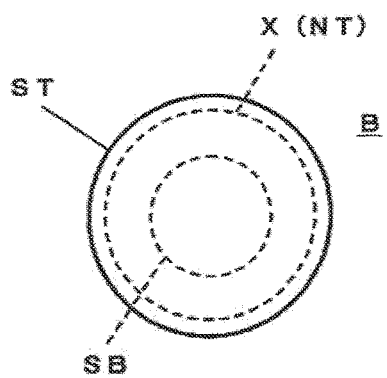
Figure 9A:
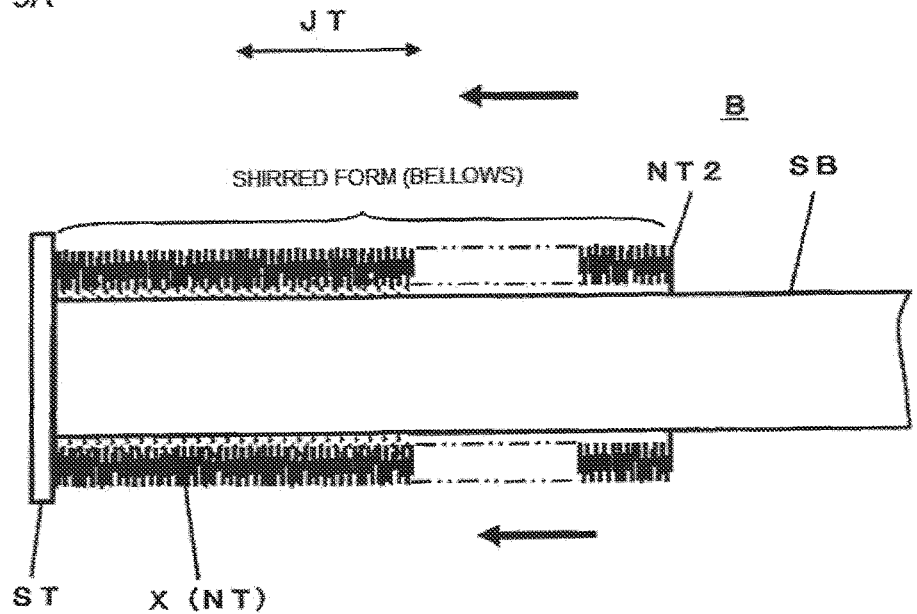
FIG. 9A and FIG. 9B are views for illustrating a netted food casing.

Subsequently, the tubular material NT is shaped into a shirred form as illustrated in FIG. 8 and FIG. 9.

The tubular material NT is shaped into a shirred form using a shirring machine B.

In FIG. 8 and FIG. 9, the shirring machine B includes a shirring axis SB and a feeding mechanism for feeding the tubular material NT to the shirring axis SB (not shown).

The tubular material NT is mounted to the shirring axis SB so as to enclose the shirring axis SB.

The shirring machine B has a stopper ST, which is brought into abutment with the one axial end NT1 of the tubular material NT, and is used for feeding the tubular material NT to the stopper ST (hereinafter referred to as "shirring step").

In the shirring step, the stopper ST is in abutment with the one axial end NT of the tubular material NT. As a result, as illustrated in FIG. 9, the tubular material NT shrinks in the axial direction JT and is shaped into a shirred form (bellows shape).

Thus, the tubular material NT has a structure stretchable in the axial direction JT.

Further, in the tubular material NT, the nonwoven fabric 1 and the net 2 have been integrated by thermal lamination. As a result, the net 2 is not separated from the nonwoven fabric 1 even when the tubular material NT is processed into a shirred form.

The tubular material NT (netted food casing X) having a shirred form is filled with kneaded raw material meat for sausage, for example, to shape, pack, and produce a processed meat product. The kneaded raw material meat is a product obtained by kneading ground meat together with a seasoning or the like.

Figure 9B:
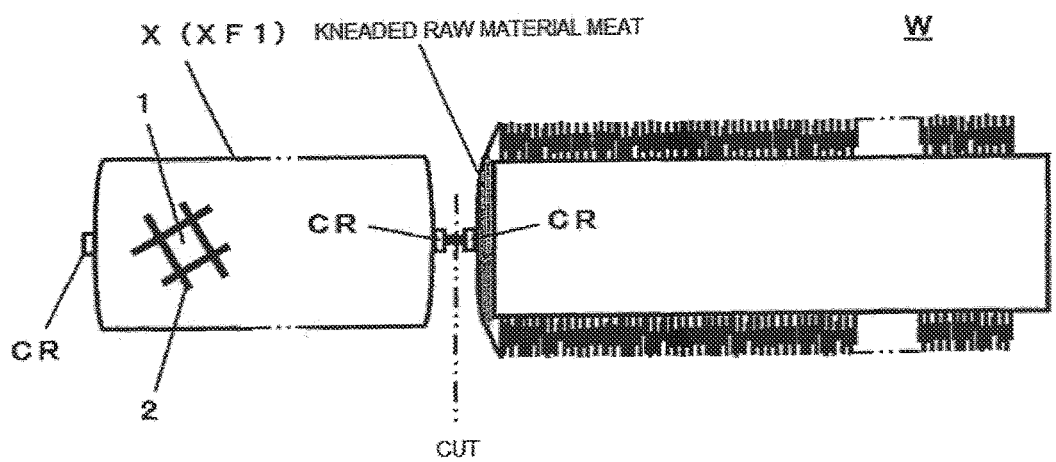

In filling with the kneaded raw material meat, the tubular material NT having a shirred form is mounted to a continuous meat filling machine W such as a double clipper. As illustrated in FIG. 9B, the one axial end NT1 of the tubular material NT is closed with a clip CR, and the tubular material is filled with kneaded raw material meat while being elongated in the axial direction JT. As illustrated in FIG. 9B, the tubular material NT having a shirred form is formed by integrating the front surface 1A (outer periphery of the tubular material NT) of the nonwoven fabric 1 with the net 2, and the net 2 is made of the thermoplastic resin (or thermoplastic synthetic fiber).

With this, when the tubular material NT having a shirred form is filled with the kneaded raw material meat, the net 2 shapes the kneaded raw material meat into a cylindrical shape (shape of sausage or the like) in cooperation with the nonwoven fabric 1 and exhibits a decoration effect (mesh design). Further, even when the tubular material NT having a shirred form is filled with the kneaded raw material meat, the net 2 is not separated from the nonwoven fabric 1 and is not mixed in the kneaded raw material meat.

The tubular material NT having a shirred form is filled with the kneaded raw material meat while being elongated, and the opening axis end NT2 of the tubular material NT is closed with a clip CR to produce a tubular bag XF1.

Subsequently, the tubular material NT filled with the kneaded raw material meat is smoked. Smoke is brought into contact with the kneaded raw material meat through among the fibers of the nonwoven fabric 1 in the same manner as in Usage pattern 1. Even in a part in which the nonwoven fabric 1 and the net 2 have been integrated, smoke is brought into contact with the kneaded raw material meat through among the fibers of the nonwoven fabric 1.

Thus, in the tubular material NT, smoke can be brought into contact with the whole (entire surface) of the kneaded raw material meat to suppress unevenness of decoration coloring, flavoring, and seasoning caused by the smoke.

After smoking, the tubular bag XF1 filled with the kneaded raw material meat is steamed. As in the case of Usage pattern 1, steam or the like is brought into contact with the kneaded raw material meat through among the fibers of the nonwoven fabric 1. Even in a part in which the nonwoven fabric 1 and the net 2 have been integrated, steam or the like is brought into contact with the kneaded raw material meat through among the fibers of the nonwoven fabric 1.

Thus, the kneaded raw material meat in the tubular bag XF1 can be sufficiently heated and sterilized to the inside.

Then, the tubular bag XF1 filled with the kneaded raw material meat is subjected to a cooling step, a secondary packing step, and the like and is shipped as a processed meat product. In the secondary packing step, the tubular bag XF1 filled with the raw material meat is vacuum-packed, and during the vacuum-packing, the nonwoven fabric 1 absorbs moisture and becomes transparent. With this, the raw material meat (smoked and steamed raw material meat) filled can be visually observed through the transparent nonwoven fabric 1.

It should be noted that the tubular material NT having a shirred form may be stuffed with raw material fish paste for a processed fish product or raw material curd for a processed dairy product to shape, pack, and produce a processed fish product such as fish sausage or fish ham, or a processed dairy product such as cheese.

In Usage patterns 1 and 2, for example, the tubular bag XF or the tubular material NT may be stuffed with raw material meat for a processed meat product, such as roast pork or raw meat, immersed into a seasoning liquid such as soy sauce, and boiled. In this step, the seasoning liquid is brought into contact with the raw material meat through among the fibers of the nonwoven fabric 1, and even in a part in which the nonwoven fabric 1 and the net 2 have been integrated, the liquid is brought into contact with the raw material meat through among the fibers of the nonwoven fabric 1.

With this, uneven boiling of the raw material meat can be suppressed.

In Usage patterns 1 and 2, the width H and the length L of the netted nonwoven fabric NF may be appropriately selected to adjust the volume of the tubular bag XF or the tubular material NT to the most suitable one for the raw material meat.

Another netted food casing according to the present invention is described with reference to FIG. 10 and FIG. 11.

Figure 10:
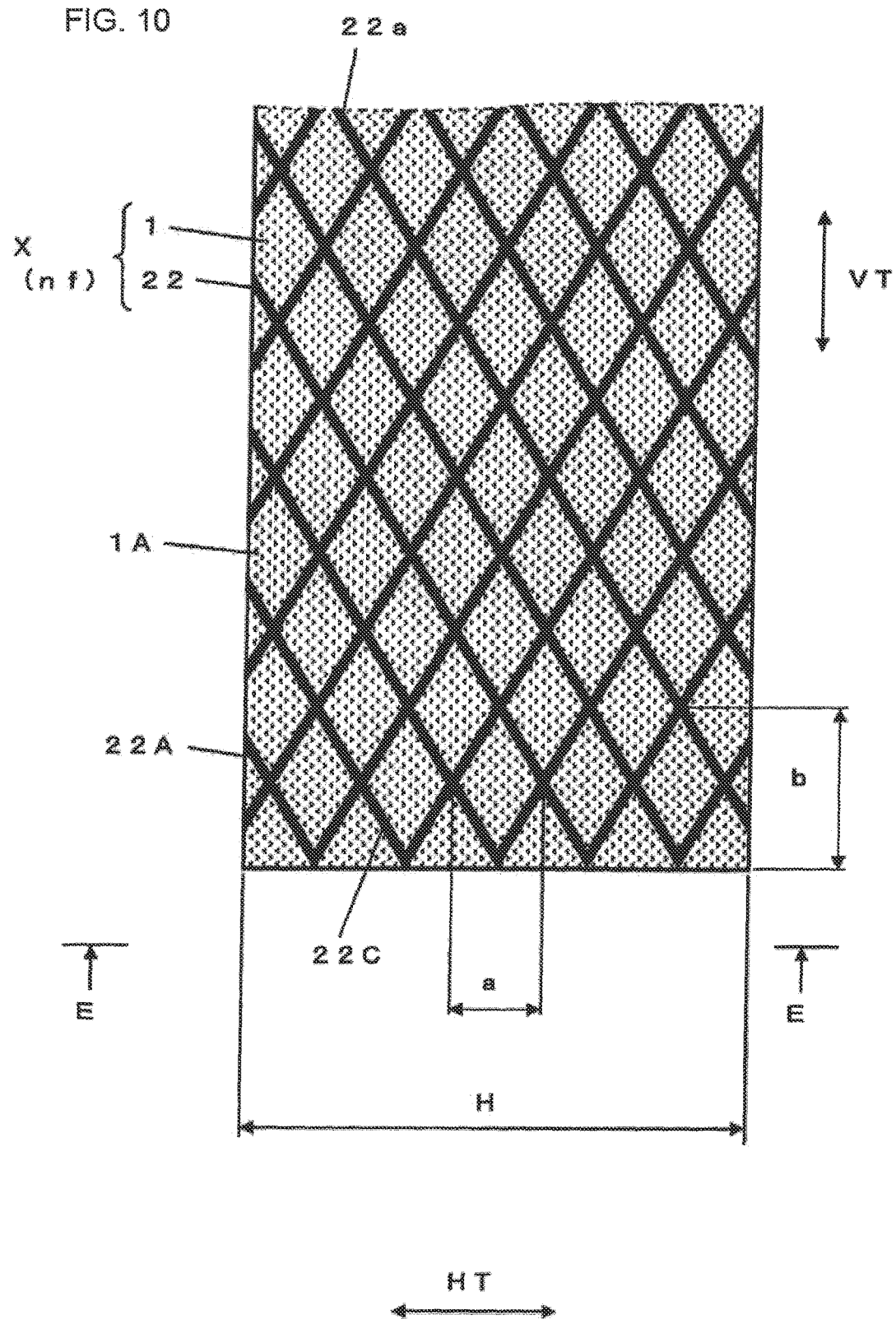
FIG. 10 is a plan view for illustrating another netted food casing (netted nonwoven fabric).
Figure 11A:
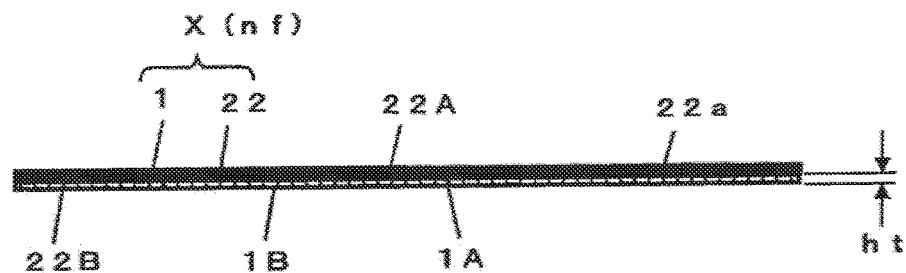
FIG. 11A and FIG. 11B are views for illustrating another netted food casing (netted nonwoven fabric).

It should be noted that in FIG. 10 and FIG. 11, the same reference numerals as in FIG. 1 to FIG. 9 represent the same members and the same structures, and hence detail descriptions thereof are omitted.

The other netted food casing X includes a nonwoven fabric 1 and a net 22 including a plant fiber or a rayon fiber, and may be formed by thermally laminating the nonwoven fabric 1 and the net 22.

The other netted food casing X includes the nonwoven fabric 1 of any one of <Nonwoven Fabric Structure A> to <Nonwoven Fabric Structure F>.

The net 22 has flexibility because the net contains the plant fiber or the rayon fiber.

As illustrated in FIG. 10 and FIG. 11, the net 22 has a plurality of wire materials 22a, and the wire materials 22a form meshes 22C (mesh scale).

The net 22 may include a colored (black, white, red, green, yellow, blue, etc.) plant fiber or a colored (black, white, red, green, yellow, blue, etc.) rayon fiber.

The net 22 is formed by arranging rhombic meshes 22C in a reticular pattern, for example. As the meshes of the net 2, there may be adopted square meshes, rectangular meshes, trapezoidal meshes, hexagonal meshes, and the like as well as the rhombic meshes.

As specific structures of the net 22, net structures k and 1 are adopted.

<Net Structure k>

The net 22 is formed by weaving wire materials (strings) made of a plant fiber into a mesh-like reticular pattern (knotless net), or by tying wire materials (strings) made of a plant fiber into a mesh-like reticular pattern (knotted net).

The plant fiber includes a cotton fiber, a hemp fiber, a pulp fiber, and the like.

<Net Structure l>

The net 22 is formed by weaving wire materials (strings) made of a rayon fiber into a mesh-like reticular pattern (knotless net), or by tying wire materials (strings) made of a rayon fiber into a mesh-like reticular pattern (knotted net).

As combination patterns of the nonwoven fabric 1 and the net 22 in the other netted food casing X, Combination Patterns 51 to 62 are adopted.

<Combination Pattern 51>

The other netted food casing X includes the nonwoven fabric 1 having the "nonwoven fabric structure A" and the net 22 having the "net structure k."

<Combination Pattern 52>

The other netted food casing X includes the nonwoven fabric 1 having the "nonwoven fabric structure A" and the net 22 having the "net structure l."

<Combination Pattern 53>

The other netted food casing X includes the nonwoven fabric 1 having the "nonwoven fabric structure B" and the net 22 having the "net structure k."

<Combination Pattern 54>

The other netted food casing X includes the nonwoven fabric 1 having the "nonwoven fabric structure B" and the net 22 having the "net structure l."

<Combination Pattern 55>

The other netted food casing X includes the nonwoven fabric 1 having the "nonwoven fabric structure C" and the net 22 having the "net structure k."

<Combination Pattern 56>

The other netted food casing X includes the nonwoven fabric 1 having the "nonwoven fabric structure C" and the net 22 having the "net structure l."

<Combination Pattern 57>

The other netted food casing X includes the nonwoven fabric 1 having the "nonwoven fabric structure D" and the net 22 having the "net structure k."

<Combination Pattern 58>

The other netted food casing X includes the nonwoven fabric 1 having the "nonwoven fabric structure D" and the net 22 having the "net structure l."

<Combination Pattern 59>

The other netted food casing X includes the nonwoven fabric 1 having the "nonwoven fabric structure E" and the net 22 having the "net structure k."

<Combination Pattern 60>

The other netted food casing X includes the nonwoven fabric 1 having the "nonwoven fabric structure E" and the net 22 having the "net structure l."

<Combination Pattern 61>

The other netted food casing X includes the nonwoven fabric 1 having the "nonwoven fabric structure F" and the net 22 having the "net structure k."

<Combination Pattern 62>

The other netted food casing X includes the nonwoven fabric 1 having the "nonwoven fabric structure F" and the net 22 having the "net structure l."

As illustrated in FIG. 10 and FIG. 11, the other netted food casing X is formed by thermally laminating the nonwoven fabric 1 and the net 22 of <Combination Patterns 51 to 62>.

In thermal lamination, the nonwoven fabric 1 and the net 22 are laminated.

As illustrated in FIG. 10 and FIG. 11, in the lamination step, the net 22 is laminated over the front surface 1A of the nonwoven fabric 1 to bring the front surface 1A of the nonwoven fabric 1 into contact with the reverse surface 22B of the net 22.

In thermal lamination, the nonwoven fabric 1 and the net 22 are heated at a melting point (heating temperature Tm) equal to or higher than the glass transition point of the thermoplastic synthetic fiber of the nonwoven fabric 1 (heating step).

Figure 11B:
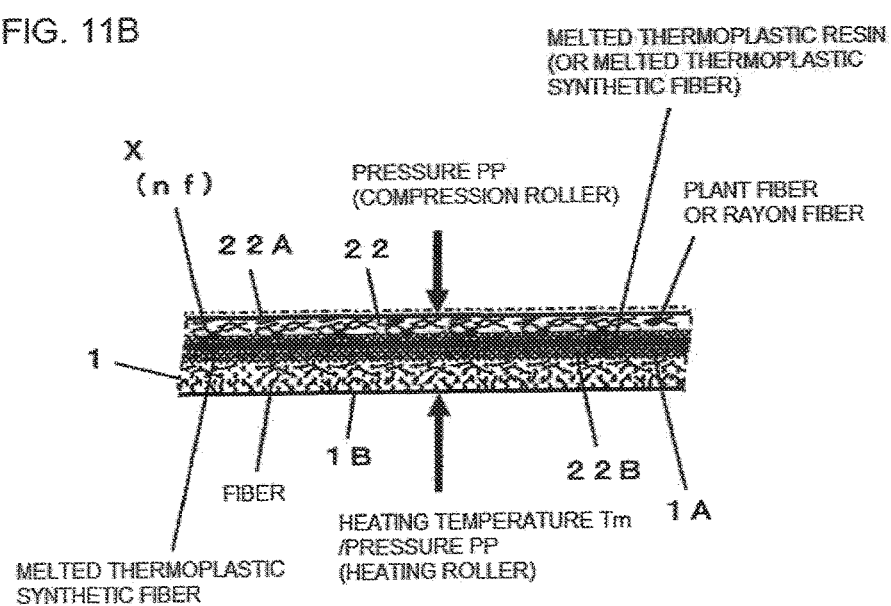

As illustrated in FIG. 11B, in the heating step, the nonwoven fabric 1 and the net 22 are heated from the reverse surface 1B of the nonwoven fabric 1 to melt the thermoplastic synthetic fiber of the nonwoven fabric 1.

The heating temperature Tm varies depending on <Combination Patterns 51 to 62>, and may be a melting point of the polyethylene fiber or the polyester fiber contained in the nonwoven fabric 1. The heating temperature is a melting point at which one or a plurality of kinds of thermoplastic synthetic fibers can be melted.

In the heating step, the time tm for heating the nonwoven fabric 1 and the net 22 is the time in which the thermoplastic synthetic fiber of the nonwoven fabric 1 can be melted while the net 22 on the front surface 22A side is not deformed by heating. The time tm is appropriately selected depending on the kind and the blend ratio in terms of mass % of the thermoplastic synthetic fiber, the thickness ht of the nonwoven fabric 1, the size of wire materials of the net, the mesh size, the mesh pitch, etc.

Thermal lamination is performed by compression of the nonwoven fabric 1 and the net 22 at a pressure PP (compression step).

As illustrated in FIG. 11B, in the compression step, the front surface 1A of the nonwoven fabric 1 and the reverse surface of the net 22 are pressure-bonded.

In the compression step, when the nonwoven fabric 1 and the net 22 are compressed at a pressure PP, as illustrated in FIG. 11B, the melted thermoplastic synthetic fiber of the nonwoven fabric 1 is brought into contact with the plant fiber (or rayon fiber) on the reverse surface side of the net 22 and gets into among the plant fibers (or rayon fibers) of the net 22 to be tangled with the plant fibers (or rayon fibers). Then, the nonwoven fabric 1 is bonded to the net 22.

The melted thermoplastic synthetic fiber of the nonwoven fabric 1 serves as a binder (adhesive) for bonding the nonwoven fabric 1 to the net 22.

The pressure PP in the compression step is a pressure that is sufficient for pressure bonding of the nonwoven fabric 1 to the net 22 and does not cause collapse and deformation of the net 22, and is appropriately selected based on the kind and the blend ratio in terms of mass % of the thermoplastic synthetic fiber of the nonwoven fabric 1, the thickness ht of the nonwoven fabric 1, the size of the wire materials of the net 22, the mesh size, the mesh pitch, etc.

The compression step is performed simultaneously with the heating step to compress the nonwoven fabric 1 and the net 22 at a pressure P1 under heating at a heating temperature Tm.

After thermal lamination, the nonwoven fabric 1 and the net 22 are cooled (cooling step).

In the cooling step, the melted thermoplastic synthetic fiber of the nonwoven fabric 1 is solidified by cooling to be integrally bonded to the plant fiber (or the rayon fiber) of the net 22.

The net 22 on the whole reverse surface 22B side adheres firmly to the front surface 1B of the nonwoven fabric 1, and the whole is integrated with the thermoplastic synthetic fiber solidified by cooling.

With this, netted nonwoven fabric of including the nonwoven fabric 1 and the net 22 is formed.

The netted nonwoven fabric nf has a structure in which the net 22 is hardly separated from the nonwoven fabric 1 because the whole reverse surface 22B of the net 22 has been integrated with (bonded to) the front surface 1A of the nonwoven fabric 1.

The nonwoven fabric 1 and the net 22 are thermally laminated using the laminating machine T, as described with reference to FIG. 3.

The netted nonwoven fabric nf is shaped into a tubular bag by thermal pressure bonding, as described with reference to FIG. 4 to FIG. 6.

Further, the netted nonwoven fabric nf is shaped into a tubular bag or a tubular material using the center press seal bag making machine A, as described with reference to FIG. 7.

Then, the tubular bag (netted food casing X) is stuffed with raw material meat (chunk of meat) for ham, bacon, or the like, for example, to shape, pack, and produce a processed meat product.

Further, as described with reference to FIG. 9, a tubular bag XF2 is shaped into a shirred form using the shirring machine B and is stuffed with raw material meat (kneaded meat) for sausage or the like, for example, using the continuous meat filling machine W such as a double clipper, to shape, pack, and produce a processed meat product.

Specific structures of the netted food casing are described below by way of Example 1 to Example 9.

In Example 1 to Example 9, properties of the netted food casing (netted nonwoven fabric, tubular bag) are evaluated (see Table 1).

Example 1

A netted food casing X of Example 1 includes a nonwoven fabric A and a net A (corresponding to <Combination Pattern 45>) and is formed by thermally laminating the nonwoven fabric A and the net A.

The nonwoven fabric A of Example 1 is a sheet-like wet nonwoven fabric produced using a cylinder paper machine from a raw material fiber obtained by blending and mixing a plurality of kinds of thermoplastic synthetic fibers A, B, and C (hereinafter referred to as "synthetic fibers A, B, and C").

The synthetic fiber A is a fiber having a core-clad structure including polyester as a core and polyethylene as a clad. The synthetic fiber A is a fiber having a fiber diameter of about from 0.55 dtx to 5.5 dtx and a fiber length of about from 2.0 mm to 12.0 mm, and is particularly preferably a fiber having a fiber diameter of 2.2 dtx and a fiber length of 10 mm. A specific example of the synthetic fiber A is "Melty (trademark) 6080 (trade name)" manufactured by Unitika Ltd.

The synthetic fiber B is a fiber having a core-clad structure including polyester as a core and low melting point polyester as a clad. The synthetic fiber B is a fiber having a fiber diameter of about from 0.55 dtx to 5.5 dtx and a fiber length of about from 2.0 mm to 12.0 mm, and is particularly preferably a fiber having a fiber diameter of 2.2 dtx and a fiber length of 5.0 mm. A specific example of the synthetic fiber B is "SOFIT (trademark) N720 (trade name)" manufactured by Kuraray Co., Ltd.

The synthetic fiber C is an ultrafine polyester fiber. In processing the raw material fiber using the cylinder paper machine, the synthetic fiber C twists the synthetic fibers together and enables migration of a wet nonwoven fabric on the nonwoven fabric and between the nonwoven fabrics. The synthetic fiber C is a fiber having a fiber diameter of about from 0.1 dtx to 0.55 dtx and a fiber length of about from 2.0 mm to 5.0 mm, and is particularly preferably a fiber having a fiber diameter of 0.1 dtx and a fiber length of 3.0 mm. A specific example of the synthetic fiber C is "TA04PN (trade name)" manufactured by Teijin Limited.

The synthetic fibers A, B, and C are blended at blend ratios of 45 mass %, 50 mass %, and 5 mass %, respectively.

In Example 1, 45 mass % of the synthetic fiber A, 50 mass % of the synthetic fiber B, and 5 mass of the synthetic fiber C are blended and mixed to produce, using the cylinder paper machine, a wet nonwoven fabric having a basis weight of 20.2 g/m², a wet nonwoven fabric having a basis weight of 30.4 g/m², a wet nonwoven fabric having a basis weight of 40.1 g/m², and a wet nonwoven fabric having a basis weight of 50.3 g/m² (wet nonwoven fabrics having different basis weights).

The net A of Example 1 is formed by mixing and melting a plurality of kinds of thermoplastic resins a and b and shaping the melted product into a rhombic mesh using an extrusion molding machine.

The thermoplastic resin a is a low melting point polyethylene resin (low-density polyethylene resin). The thermoplastic resin b is a high melting point polyethylene resin (high-density polyethylene resin).

The thermoplastic resins a and b are blended so that the net includes 10 mass % of the low melting point polyethylene resin and 90 mass % of the high melting point polyethylene resin. A specific example of the thermoplastic resin a is a low melting point polyethylene resin manufactured by Sumitomo Chemical Co., Ltd., and a specific example of the thermoplastic resin b is a high melting point polyethylene resin manufactured by Prime Polymer Co., Ltd.

As illustrated in FIG. 1, the net A of Example 1 is formed by arranging rhombic meshes in a reticular pattern. For example, the size of wire materials 2A is about from 0.5 mm to 1.0 mm, and the lengths of a diagonal line a and a diagonal line b in each rhombic mesh 2C are 15.0 mm and 25.0 mm, respectively.

As illustrated in FIG. 3, the nonwoven fabric A and the net A of Example 1 are thermally laminated using the laminating machine T.

The net A of Example 1 is laminated on the nonwoven fabric A to bring the whole reverse surface of the net A into contact with the front surface of the nonwoven fabric A.

As illustrated in FIG. 3, in the laminating machine T, the heating roller TR is brought into contact with the reverse surface of the nonwoven fabric A. The heating roller TR is brought into line contact with the reverse surface of the nonwoven fabric A in the width direction HT of the nonwoven fabric A. The compression roller PR is brought into line contact with the reverse surface of the net A in the width direction HT of the net A to compress the net A and the nonwoven fabric A to the heating roller TR. The nonwoven fabric A and the net A are subjected to a linear pressure P in the width direction HT by the heating roller TR and the compression roller PR.

Thermal lamination of Example 1 is performed at a heating temperature Tm of 160° C., a linear pressure P of 30 kgf/cm, and a feeding rate V of 10 m/min.

In Example 1, there are produced: a netted nonwoven fabric obtained by thermally laminating a nonwoven fabric A having a basis weight of 20.2 g/m² and the net A (hereinafter referred to as "Example 1-1"); a netted nonwoven fabric obtained by thermally laminating a nonwoven fabric A having a basis weight of 30.4 g/m² and the net A (hereinafter referred to as "Example 1-2"); a netted nonwoven fabric obtained by thermally laminating a nonwoven fabric A having a basis weight of 40.1 g/m² and the net A (hereinafter referred to as "Example 1-3"); and a netted nonwoven fabric obtained by thermally laminating a nonwoven fabric A having a basis weight of 50.3 g/m² and the net A (hereinafter referred to as "Example 1-4").

In thermal lamination of Example 1, the clad parts of the synthetic fibers A and B (polyethylene resin and low melting point polyester resin) of the nonwoven fabric A and the thermoplastic resins a and b (low melting point polyethylene resin and high melting point polyethylene) of the net A are melted under linear pressure, and the nonwoven fabric A and the net A are pressure-bonded with the melted resins. Further, in the nonwoven fabric A of Example 1, the core parts of the synthetic fibers A and B (polyester resins) and the synthetic fiber C (polyester fiber) serve as fibers of the nonwoven fabric A. On the other hand, the net A of Example 1 has flexibility by virtue of the thermoplastic resin a (low melting point polyethylene).

Example 2

A netted food casing of Example 2 includes a nonwoven fabric A and a net B (or net C) (corresponding to <Combination Pattern 45>) and is formed by thermally laminating the nonwoven fabric A and the net B, or the nonwoven fabric A and the net C.

As in the case of the nonwoven fabric of Example 1, the nonwoven fabric A of Example 2 is obtained by blending and mixing 45 mass % of the synthetic fiber A, 50 mass % of the synthetic fiber B, and 5 mass % of the synthetic fiber C to produce a wet nonwoven fabric having a basis weight of 30.4 g/m² using the cylinder paper machine.

In the same manner as in Example 1, the net B of Example 2 is shaped by mixing and melting the thermoplastic resins a and b and shaping the resultant into rhombic meshes using an extrusion molding machine.

The net B of Example 2 includes the thermoplastic resins a and b so that the net includes 50 mass % of the low melting point polyethylene resin and 50 mass % of the high melting point polyethylene resin.

The net C of Example 2 includes the thermoplastic resins a and b so that the net includes 70 mass % of the low melting point polyethylene resin and 30 mass % of the high melting point polyethylene resin.

As in the case of the net of Example 1, in the nets B and C of Example 2, the size of wire materials 2a is about from 0.5 mm to 1.0 mm, and the lengths of a diagonal line a and a diagonal line b in each rhombic mesh are 15.0 mm and 25.0 mm, respectively (see FIG. 1).

The nonwoven fabric A and the net B (or net C) of Example 2 are thermally laminated using the laminating machine (see FIG. 3) in the same manner as in Example 1.

As in Example 1, thermal lamination of Example 2 is performed at a heating temperature Tm of 160° C., a linear pressure P of 30 kgf/cm, and a feeding rate V of 10 m/min.

In Example 2, there are produced: a netted nonwoven fabric obtained by thermally laminating the nonwoven fabric A. and the net B (hereinafter referred to as "Example 2-1"); and a netted nonwoven fabric obtained by thermally laminating the nonwoven fabric A and the net C (hereinafter referred to as "Example 2-2").

In the same manner as in Example 1, in thermal lamination of Example 2, the clad parts of the synthetic fibers A and B (polyethylene resin and low melting point polyester resin) of the nonwoven fabric A and the thermoplastic resins a and b (low melting point polyethylene resin and high melting point polyethylene) of the net B or C are melted under linear pressure, and the nonwoven fabric A and the net B or the nonwoven fabric A and the net C are pressure-bonded with the melted resins. Further, in Example 2-1 and Example 2-2, the ratio in terms of mass % of the thermoplastic resin a (low melting point polyethylene resin) in the net B (or net C) is higher than that in the net A of Example 1, and hence the net B has higher flexibility.

In addition, in the nonwoven fabric A, the core parts of the synthetic fibers A and B and the synthetic fiber C serve as fibers of the nonwoven fabric A as in the case of Example 1. The nets B and C have flexibility by virtue of the thermoplastic resin b (low melting point polyethylene resin).

Example 3

A netted food casing of Example 3 includes a nonwoven fabric B and a net B (or net C) (corresponding to <Combination Pattern 55>) and is formed by thermally laminating the nonwoven fabric B and the net B, or the nonwoven fabric B and the net C.

The nonwoven fabric B of Example 3 is a sheet-like wet nonwoven fabric produced using the cylinder paper machine from a raw material fiber obtained by blending and mixing a plurality of kinds of thermoplastic synthetic fibers A and D and a plant fiber A.

The synthetic fiber A is a fiber having the same core-clad structure as that of Example 1. The synthetic fiber D is a polyethylene fiber. The plant fiber A is a hemp pulp fiber.

The synthetic fibers A and D and the plant fiber A are blended at blend ratios in terms of mass % of 40 mass %, 40 mass %, and 20 mass %, respectively.

The nonwoven fabric B of Example 3 is obtained by blending and mixing 40 mass % of the synthetic fiber A, 40 mass % of the synthetic fiber D, and 20 mass % of the plant fiber A to produce a wet nonwoven fabric having a basis weight of 30.4 g/m².

The nets B and C of Example 3 have the same structures as those in Example 2.

The nonwoven fabric B and the net B (or net C) of Example 3 are thermally laminated using the laminating machine (see FIG. 3) in the same manner as in Example 1.

As in Example 1, thermal lamination of Example 3 is performed at a heating temperature Tm of 160° C., a linear pressure P of 30 kgf/cm, and a feeding rate V of 10 m/min.

In Example 3, there are produced: a netted nonwoven fabric obtained by thermally laminating the nonwoven fabric B having a basis weight of 30.4 g/m² and the net B (hereinafter referred to as "Example 3-1"); and a netted nonwoven fabric obtained by thermally laminating the nonwoven fabric B and the net C (hereinafter referred to as "Example 3-2").

In thermal lamination of Example 3, the clad part of the synthetic fiber A (polyethylene resin) of the nonwoven fabric B and the thermoplastic resins a and b (low melting point polyethylene resin and high melting point polyethylene) of the net B (or the net C) are melted under linear pressure, and the nonwoven fabric B and the net B or the nonwoven fabric B and the net C are pressure-bonded with the melted resins. Further, in the nonwoven fabric B, the core part of the synthetic fiber A (polyester), and the synthetic fiber D (polyester fiber), and the plant fiber A (hemp pulp fiber) serve as fibers of the nonwoven fabric B. In addition, the net B (or the net C) has flexibility by virtue of the thermoplastic resin a (low melting point polyethylene resin).

Example 4

A netted food casing of Example 4 includes a nonwoven fabric C and a net B (or net C) (corresponding to <Combination Pattern 45>) and is formed by thermally laminating the nonwoven fabric C and the net B, or the nonwoven fabric C and the net C.

The nonwoven fabric C of Example 4 is a spunbond nonwoven fabric made of a thermoplastic synthetic fiber E (long fiber). The synthetic fiber E is a fiber having a core-clad structure including polyester as a core and polyethylene as a clad.

A specific example of the nonwoven fabric C is "Eleves (trademark) T0203WDO (trade name)" manufactured by Unitika Ltd.

The nonwoven fabric C of Example 4 is a spunbond nonwoven fabric having a basis weight of 20.0 g/m² obtained by a spunbonding method.

The nets B and C of Example 4 have the same structures as those in Example 2.

The nonwoven fabric C and the net B (or net C) of Example 4 are thermally laminated using the laminating machine (see FIG. 3) in the same manner as in Example 1.

As in Example 1, thermal lamination of Example 4 is performed at a heating temperature Tm of 160° C., a linear pressure P of 30 kgf/cm, and a feeding rate V of 10 m/min.

In Example 4, there are produced: a netted nonwoven fabric obtained by thermally laminating the nonwoven fabric C and the net B (hereinafter referred to as "Example 4-1"); and a netted nonwoven fabric obtained by thermally laminating the nonwoven fabric C and the net C (hereinafter referred to as "Example 4-2").

In thermal lamination of Example 4, the clad part of the synthetic fiber E (polyethylene resin) of the nonwoven fabric C and the thermoplastic resins a and b (low melting point polyethylene resin and high melting point polyethylene) of the net B or C are melted under high linear pressure, and the nonwoven fabric C and the net B or the nonwoven fabric C and the net C are pressure-bonded with the melted polyethylene resins. Further, in the nonwoven fabric C, the core part of the synthetic fiber E (polyester resin) serves as a fiber of the nonwoven fabric C. In addition, the net B or C has flexibility by virtue of the thermoplastic resin a (low melting point polyethylene).

Example 5

A netted food casing of Example 5 includes a nonwoven fabric A and a net D (corresponding to <Combination Pattern 43>) and is formed by thermally laminating the nonwoven fabric A and the net D.

The nonwoven fabric A of Example 5 has the same structure as that in Example 1.

In Example 5, 45 mass of the synthetic fiber A, 50 mass % of the synthetic fiber B, and 5 mass % of the synthetic fiber C are blended and mixed to produce, using the cylinder paper machine, a wet nonwoven fabric having a basis weight of 20.2 g/m², a wet nonwoven fabric having a basis weight of 30.4 g/m², a wet nonwoven fabric having a basis weight of 40.1 g/m², and a wet nonwoven fabric having a basis weight of 50.3 g/m².

The net D of Example 5 is formed by weaving a thermoplastic synthetic fiber c in a mesh-like reticular pattern. The thermoplastic synthetic fiber c is a polyester fiber. Further, the net D includes 100 mass % of the thermoplastic synthetic fiber c (polyester fiber).

A specific example of the net D of Example 5 is "Flat sheet net C" manufactured by Nihon Tape Co., Ltd.

As in the case of the net of Example 1, in the net D of Example 5, the size of wire materials 2a is about from 0.5 mm to 1.0 mm, and the lengths of a diagonal line a and a diagonal line b in each rhombic mesh are 15.0 mm and 25.0 mm, respectively (see FIG. 1).

The nonwoven fabric A and the net D of Example 5 are thermally laminated using the laminating machine (see FIG. 3) in the same manner as in Example 1.

Thermal lamination of Example 5 is performed at a heating temperature Tm of 170° C., a linear pressure P of 40 kgf/cm, and a feeding rate V of 10 m/min.

In Example 5, there are produced: a netted nonwoven fabric obtained by thermally laminating the nonwoven fabric A having a basis weight of 20.2 g/m² and the net D (hereinafter referred to as "Example 5-1"); a netted nonwoven fabric obtained by thermally laminating the nonwoven fabric A having a basis weight of 30.4 g/m² and the net D (hereinafter referred to as "Example 5-2"); a netted nonwoven fabric obtained by thermally laminating the nonwoven fabric A having a basis weight of 40.1 g/m² and the net D (hereinafter referred to as "Example 5-3"); and a netted nonwoven fabric obtained by thermally laminating the nonwoven fabric A having a basis weight of 50.3 g/m² and the net D (hereinafter referred to as "Example 5-4").

In thermal lamination of Example 5, the clad part of the synthetic fiber B (low melting point polyester resin) of the nonwoven fabric A and the polyester fiber of the net D are melted under high linear pressure, and the nonwoven fabric A and the net D are pressure-bonded with the melted resins. Further, in the nonwoven fabric A, the core parts of the synthetic fibers A and B (polyester) and the synthetic fiber C (ultrafine polyester fiber) serve as fibers of the nonwoven fabric A. The net D has flexibility by virtue of the thermoplastic synthetic fiber c (polyester fiber).

Example 6

A netted food casing of Example 6 includes a nonwoven fabric B and a net D (corresponding to <Combination Pattern 53>) and is formed by thermally laminating the nonwoven fabric B and the net D.

The nonwoven fabric B of Example 6 has the same structure as that in Example 3.

The net D of Example 6 has the same structure as that in Example 5.

The nonwoven fabric B and the net D of Example 6 are thermally laminated using the laminating machine (see FIG. 3) in the same manner as in Example 1.

Thermal lamination of Example 6 is performed at a heating temperature Tm of 170° C., a linear pressure P of 40 kgf/m², and a feeding rate V of 10 m/min.

In Example 6, there is produced a netted nonwoven fabric obtained by thermally laminating the nonwoven fabric B having a basis weight of 30.4 g/m² and the net D (hereinafter referred to as "Example 6").

In thermal lamination of Example 6, the clad part of the synthetic fiber B (low melting point polyester resin) of the nonwoven fabric B and the polyester fiber of the net D are melted under high linear pressure, and the nonwoven fabric B and the net D are pressure-bonded with the melted resins and the like. Further, in the nonwoven fabric B, the core part of the synthetic fiber A (polyester resin) and the plant fiber (hemp pulp fiber) serve as fibers of the nonwoven fabric B. In addition, the net D has flexibility by virtue of the thermoplastic synthetic fiber c (polyester fiber).

Example 7

A netted food casing of Example 7 includes a nonwoven fabric D and a net D (corresponding to <Combination Pattern 53>) and is formed by thermally laminating the nonwoven fabric D and the net D.

The nonwoven fabric D of Example 7 is a wet nonwoven fabric produced using the cylinder paper machine from a raw material fiber obtained by blending and mixing a plurality of kinds of thermoplastic synthetic fibers A and B and a plant fiber A.

The synthetic fibers A and B are fibers having the same structures as those of Example 1. The plant fiber A is a hemp pulp fiber.

The synthetic fibers A and B and the plant fiber A are blended at blend ratios in terms of mass % of 40 mass %, 40 mass %, and 20 mass %, respectively.

The nonwoven fabric D of Example 7 is obtained by blending and mixing 40 mass of the synthetic fiber A, 40 mass % of the synthetic fiber B, and 20 mass % of the plant fiber to produce a wet nonwoven fabric having a basis weight of 30.3 g/m² using the cylinder paper machine (hereinafter referred to as "Example 7").

The net D of Example 7 has the same structure as that in Example 5.

The nonwoven fabric D and the net D of Example 7 are thermally laminated using the laminating machine (see FIG. 3) in the same manner as in Example 1.

Thermal lamination of Example 7 is performed at a heating temperature Tm of 170° C., a linear pressure P of 40 kgf/cm, and a feeding rate V of 10 m/min.

In Example 7, there is produced a netted nonwoven fabric obtained by thermally laminating the nonwoven fabric D having a basis weight of 30.3 g/m² and the net D (hereinafter referred to as "Example 7").

In thermal lamination of Example 7, the clad part of the synthetic fiber B (low melting point polyester resin) of the nonwoven fabric D and the polyester fiber of the net D are melted under high linear pressure, and the nonwoven fabric D and the net D are pressure-bonded with the melted resins and the like. Further, in the nonwoven fabric D, the core parts of the synthetic fibers A and B (polyester resins) and the plant fiber A (hemp pulp fiber) are not melted and serve as fibers of the nonwoven fabric D. In addition, the net D has flexibility by virtue of the thermoplastic synthetic fiber c (polyester fiber).

Example 8

A netted food casing of Example 8 includes a nonwoven fabric B and a net E (corresponding to <Combination Pattern 62>) and is formed by thermally laminating the nonwoven fabric B and the net E.

The nonwoven fabric B of Example 8 has the same structure as that in Example 3.

In Example 8, 40 mass % of the synthetic fiber A, 40 mass % of the synthetic fiber D, and 20 mass % of the plant fiber are blended and mixed to produce, using the cylinder paper machine, a wet nonwoven fabric having a basis weight of 30.4 g/m².

The net E of Example 8 is formed by weaving wire materials made of a rayon fiber into a knotless net. The net E is formed of 100 mass % of the rayon fiber.

As illustrated in FIG. 10, the net E is formed by arranging rhombic meshes in a reticular pattern, the size of wire materials 22a is about from 0.7 mm to 1.0 mm, and the lengths of a diagonal line a and a diagonal line b in each rhombic mesh are 15.0 mm and 25.0 mm, respectively.

The nonwoven fabric B and the net E of Example 8 are thermally laminated using the laminating machine (see FIG. 3) in the same manner as in Example 1.

Thermal lamination of Example 8 is performed at a heating temperature Tm of 170° C., a linear pressure P of 40 kgf/cm, and a feeding rate V of 10 m/min.

In Example 8, there is produced a netted nonwoven fabric obtained by thermally laminating the nonwoven fabric B having a basis weight of 30.4 g/m² and the net E (hereinafter referred to as "Example 8").

In thermal lamination of Example 8, the clad part of the synthetic fiber A (polyethylene resin) of the nonwoven fabric B and the synthetic fiber D (polyethylene resin) are melted under a high linear pressure, and the nonwoven fabric B and the net E are pressure-bonded with the melted resins. In the nonwoven fabric B, the core part of the synthetic fiber A and the plant fiber A are not melted and serve as fibers of the nonwoven fabric B. In addition, the net E maintains its net shape by the rayon fiber.

Example 9

A netted food casing of Example 9 includes a nonwoven fabric B and a net F (corresponding to <Combination Pattern 61>) and is formed by thermally laminating the nonwoven fabric B and the net F.

The nonwoven fabric B of Example 9 has the same structure as that in Example 3.

In Example 9, 40 mass % of the synthetic fiber A, 40 mass of the synthetic fiber D, and 20 mass % of the plant fiber are blended and mixed to produce, using the cylinder paper machine, a wet nonwoven fabric having a basis weight of 30.4 g/m².

The net F of Example 9 is formed by weaving wire materials made of a cotton fiber into a knotless net. The net F is formed of 100 mass % of the cotton fiber.

The net F is formed by arranging rhombic meshes in a reticular pattern, the size of wire materials 22a is about from 0.7 mm to 1.0 mm, and the lengths of a diagonal line a and a diagonal line b in each rhombic mesh are 15.0 mm and 25.0 mm, respectively (see FIG. 10).

The nonwoven fabric B and the net F of Example 9 are thermally laminated using the laminating machine (see FIG. 3) in the same manner as in Example 1.

Thermal lamination of Example 9 is performed at a heating temperature Tm of 170° C., a linear pressure P of 40 kgf/cm, and a feeding rate V of 10 m/min.

In Example 9, there is produced a netted food casing obtained by thermally laminating the nonwoven fabric B having a basis weight of 30.4 g/m² and the net F (hereinafter referred to as "Example 9").

In thermal lamination in Example 9, the clad part of the synthetic fiber A (polyethylene resin) of the nonwoven fabric B and the synthetic fiber D (polyethylene resin) are melted under high linear pressure, and the nonwoven fabric B and the net F are pressure-bonded with the melted resins. Further, in the nonwoven fabric B, the core part of the synthetic fiber A and the plant fiber A serve as fibers of the nonwoven fabric B. The net F maintains its net shape by the cotton fiber.

As illustrated in FIG. 7, the netted nonwoven fabrics of Example 1 to Example 9 are shaped into tubular bags using a center press seal bag making machine (for example, "HSP-250-SA" manufactured by Nishibe Kikai Co., Ltd.).

As illustrated in FIG. 5 and FIG. 6, the center press seal bag making machine A is used to thermally pressure-bond the overlapped region KT of the tubular bag (vertical thermal pressure bonding step) and to thermally pressure-bond the one axial end of the tubular bag (horizontal thermal pressure bonding step). The center press seal bag making machine A is further used to cut the product into a bag length L to produce tubular bags of Example 1 to Example 9. The vertical thermal pressure bonding step and the horizontal thermal pressure bonding step are performed at a heating temperature of 200° C., and in the vertical thermal pressure bonding step, the netted nonwoven fabrics of Example 1 to Example 9 are fed to the vertical thermal pressure bonding device VH at a feeding rate of 10 m/min.

As illustrated in FIG. 6, in Example 1 to Example 9, tubular bags having a folded bag diameter H1 of 110 mm and a bag length L of 250 mm are produced. It should be noted that the folded bag diameter H1 is a width size H of a tubular bag having been flattened.

The tubular bags of Example 1 to Example 9 are stuffed (filled) with, for example, raw material meat (chunk of pork) for ham as a processed meat product, and are subjected to pre-smoking drying, smoking, and post-smoking drying.

The pre-smoking drying is performed by drying the tubular bags stuffed with chunk of pork of Example 1 to Example 9 (hereinafter referred to as "meat-stuffed tubular bags of Example 1 to Example 9") at a drying temperature of 90° C. and a humidity of 15% for 90 minutes.

The smoking is performed by smoking the meat-stuffed tubular bags of Example 1 to Example 9 with smoke of cherry wood or the like at a temperature of 90° C. for 90 minutes.

The post-smoking drying is performed by drying the meat-stuffed tubular bags of Example 1 to Example 9 at a temperature of 90° C. for 10 minutes.

Subsequently, the meat-stuffed tubular bags of Example 1 to Example 9 are cooled and vacuum-packed to produce ham products (processed meat products).

The products of Example 1 to Example 9 are evaluated for the following properties.
1) Lamination suitability
2) Flexibility
3) Mechanical suitability
4) Filling strength
5) Shirring suitability
6) Transparency
7) Smoking suitability
8) Shaping property
9) Air permeability The lamination suitability represents bonding strength (peeling strength) of a nonwoven fabric and a net. When a load is applied onto the net of netted nonwoven fabric and the net is not peeled off from the nonwoven fabric by a load of "100 g" or more, the netted nonwoven fabric is evaluated as "A" (most suitable (very good)) and as "B" (suitable (good)).

The flexibility represents flexibility of a netted nonwoven fabric and a tubular bag.

The mechanical suitability represents a bag making property (ease of shaping of a tubular bag) of a netted nonwoven fabric and a filling property with raw material meat (chunk of meat or kneaded meat) for a processed meat product.

The filling strength represents strength in filling of a tubular bag with raw material meat (chunk of meat or kneaded meat) for a processed meat product.

The shirring suitability represents flexibility and durability against breakage in shaping of a tubular bag into a shirred form.

The transparency represents a degree of transparency of a meat-stuffed tubular bag having been subjected to pre-smoking drying, smoking, post-smoking drying, and vacuum packing.

The shaping property represents a shaping state (degree of change in shape or deformation) of a processed meat product after a tubular bag is stuffed (filled) with raw material meat and subjected to pre-smoking drying, smoking, and post-smoking drying.

The air permeability represents permeability of a gas (air) or liquid (water or the like) in a meat-stuffed tubular bag.

The results of the evaluations of properties in Example 1 to Example 9 are shown in Table 1.

In Table 1, Letter "A" represents "most suitable (very good)," Letter "B" represents "suitable (good)," Letter "C" represents "slightly unsuitable (slightly poor)," and Letter "D" represents "unsuitable (poor)."

TABLE 1

Evaluation of Properties

| Example | Lamination suitability | Flexibility | Mechanical suitability | Filling strength | Shirring suitability | Transparency | Smoking suitability | Shaping property | Air permeability |
|---|---|---|---|---|---|---|---|---|---|
| 1-1 | B | A | C | C | C | A | A | B | A |
| 1-2 | B | B | B | B | C | B | A | A | A |
| 1-3 | B | B | B | A | B | B | B | A | A |
| 1-4 | B | C | B | A | B | C | C | A | B |
| 2-1 | A | B | B | B | B | B | A | B | A |
| 2-2 | A | A | B | B | A | B | A | A | A |
| 3-1 | A | B | B | B | B | B | A | A | A |
| 3-2 | A | A | B | B | A | B | A | A | A |
| 4-1 | A | A | C | B | D | B | A | D | A |
| 4-2 | A | A | C | B | D | B | A | D | A |
| 5-1 | B | A | C | C | C | A | A | B | A |
| 5-2 | B | B | B | B | C | B | A | A | A |
| 5-3 | B | B | B | A | B | B | B | A | A |
| 5-4 | B | C | B | A | B | C | C | A | B |
| 6 | D | — | — | — | — | — | — | — | — |
| 7 | B | B | B | B | B | B | A | A | B |
| 8 | D | B | C | C | D | B | A | C | A |
| 9 | C | A | C | C | D | B | A | B | A |

A: Most suitable (very good),
B: Suitable (good),
C: Slightly unsuitable (slightly poor),
D: Unsuitable (poor)

In Table 1 above, the products of Example 1-3, Example 2-1, Example 2-2, Example 3-1, Example 3-2, Example 5-3, and Example 7 are evaluated as "A" (most suitable (very good)) or "B" (suitable (good)) on all the evaluation items.

The products of Example 1-3, Example 2-1, Example 2-2, Example 3-1, Example 3-2, Example 5-3, and Example 7 can be said to be most suitable for a netted food casing.

In Table 1 above, the products of Example 1-1, Example 1-2, Example 4-1, Example 4-2, Example 5-1, and Example 5-2 are evaluated as "C" (slightly unsuitable (slightly poor)) or "D" (unsuitable (poor)) on the evaluation item "Shirring suitability" and as "A" (most suitable (very good)) or "B" (suitable (good)) on other evaluation items.

In Table 1 above, the product of Example 1-4 is evaluated as "C" (slightly unsuitable (slightly poor)) on the evaluation items "Transparency" and "Smoking suitability" and as "A" (most suitable (very good)) or "B" (suitable (good)) on other evaluation items.

In Table 1 above, the product of Example 5-4 is evaluated as "C" (slightly unsuitable (slightly poor)) on the evaluation items "Flexibility," "Shirring suitability", and "Transparency" and as "A" (most suitable (very good)) or "B" (suitable (good)) on other evaluation items.

In Table 1 above, the product of Example 6 is evaluated as "D" (unsuitable (poor)) on the evaluation item "Lamination suitability."

In Table 1 above, the product of Example 8 is evaluated as "D" (unsuitable (poor)) on the evaluation items "Lamination suitability" and "Shirring suitability". In Example 8, the clad part of the synthetic fiber A (polyethylene resin) of the nonwoven fabric B is melted and brought into contact with the rayon fiber of the net D to bond the nonwoven fabric B to the net D. As a result, the product of Example 8 was evaluated as "D" (unsuitable (poor)) on the evaluation items "Lamination suitability" and "Shirring suitability" owing to lack of the bonding force (adhesive) between the nonwoven fabric B and the net D, and it is necessary to adjust the heating temperature Tm, the linear pressure P, and the feeding rate V in thermal lamination, and various sizes in the nonwoven fabric B and the net D.

In Table 1 above, the product of Example 9 is evaluated as "C" (slightly unsuitable (slightly poor)) on the evaluation item "Lamination suitability" and as "D" (unsuitable (poor)) on the evaluation item "Shirring suitability." In the same manner as in Example 8, in Example 9, the clad part of the synthetic fiber A (polyethylene resin) of the nonwoven fabric B is melted and brought into contact with the cotton fiber of the net E to bond the nonwoven fabric B to the net E. As a result, the product of Example 9 was evaluated as "C" (slightly unsuitable (slightly poor)) and "D" (unsuitable (poor)) on the evaluation items "Lamination suitability" and "Shirring suitability" owing to lack of the bonding force (adhesive) between the nonwoven fabric B and the net E, and it is necessary to adjust the heating temperature Tm, the linear pressure P, and the feeding rate V in thermal lamination, and various sizes in the nonwoven fabric B and the net E.

The present invention is most suitable for shaping, packing, and producing a processed food product typified by a processed meat product, a processed fish product, and a processed dairy product.

What is claimed is:

1. A netted food casing, comprising:
a nonwoven composite fabric comprising a composite thermoplastic synthetic fiber and a plant fiber, wherein the plant fiber may be a cotton fiber, a hemp fiber, a pulp fiber or a rayon fiber;
a net comprising a thermoplastic resin;
wherein the net is laminated on and thermally pressure-bonded to the nonwoven composite fabric, by bringing a reverse surface of the net into contact with a front surface of the nonwoven composite fabric,
wherein the net is formed by shaping wire materials obtained by mixing and melting a low melting point polyethylene resin, a high melting point polyethylene resin into a mesh-like reticular pattern,
wherein the nonwoven composite fabric and the net are heated from a reverse surface of the nonwoven composite fabric,
and wherein the nonwoven composite fabric and the net are bonded by a melted clad of the fiber and the melted low melting point polyethylene resin and high melting point polyethylene resin on the reverse surface side of the net maintaining its shape on the front surface side.

2. A netted food casing, comprising:
a nonwoven composite fabric comprising a composite thermoplastic synthetic fiber comprised of a fiber having a core-clad structure including a polyester core and a polyethylene clad, a polyethylene fiber and a plant fiber, wherein the plant fiber may be a cotton fiber, a hemp fiber, a pulp fiber or a rayon fiber;
a net comprising a thermoplastic resin;
wherein the net is laminated on and thermally pressure-bonded to the nonwoven composite fabric, by bringing a reverse surface of the net into contact with a front surface of the nonwoven composite fabric,
wherein the net is formed by shaping wire materials obtained by mixing and melting a low melting point polyethylene resin and a high melting point polyethylene resin into a mesh-like reticular pattern,
wherein the nonwoven composite fabric and the net are heated from a reverse surface of the nonwoven composite fabric,
and wherein the nonwoven composite fabric and the net are bonded by the melted clad of the fiber having a core-clad structure and the melted low melting point polyethylene resin and the melted high melting point polyethylene resin on the reverse surface side of the net maintaining its shape on the front surface side.

3. A netted food casing, comprising:
a nonwoven composite fabric comprising a composite thermoplastic synthetic fiber comprised of a fiber having a core-clad structure including polyester as a core and polyethylene as a clad, a fiber having a core-clad structure including polyester as a core and low melting polyester as a clad, and a plant fiber wherein the plant fiber may be a cotton fiber, a hemp fiber, a pulp fiber or a rayon fiber; and
a net comprising a thermoplastic resin,
wherein the net is laminated on and thermally pressure-bonded to the nonwoven composite fabric, by bringing a reverse surface of the net into contact with a front surface of the nonwoven composite fabric,
wherein the net is formed by shaping wire materials obtained by mixing and melting a low melting point polyethylene resin, a high melting point polyethylene resin into a mesh-like reticular pattern,
wherein the nonwoven composite fabric and the net are heated from a reverse surface of the nonwoven composite fabric,
and wherein the nonwoven composite fabric and the net are bonded by the melted clad of the fibers having a core-clad structure and the melted low melting point polyethylene resin and the melted high melting point polyethylene resin on the reverse surface side of the net maintaining its shape on the front surface side.

4. A netted food casing, comprising:
a nonwoven composite fabric comprising a polyester fiber and a plant fiber wherein the plant fiber may be a cotton fiber, a hemp fiber, a pulp fiber or a rayon fiber; and
a net comprising thermoplastic resin,
wherein the net is laminated on and thermally pressure-bonded to the nonwoven composite fabric by bringing a reverse surface of the net into contact with a front surface of the nonwoven composite fabric,
wherein the net is formed by shaping wire materials obtained by mixing and melting a low melting point polyethylene resin and a high melting point polyethylene resin into a mesh-like reticular pattern,
wherein the nonwoven composite fabric and the net are heated from a reverse surface of the nonwoven composite fabric, and wherein the nonwoven composite fabric and the net are bonded by the melted polyester fiber of the nonwoven composite fabric and the melted low melting point polyethylene resin and the melted high melting point polyethylene resin on the reverse surface side of the net maintaining its shape on the front surface side.

5. A netted food casing, comprising:

a nonwoven composite fabric comprising a polyethylene fiber and a plant fiber wherein the plant fiber may be a cotton fiber, a hemp fiber, a pulp fiber or a rayon fiber; and a net comprising a thermoplastic resin, wherein the net is laminated on and thermally pressure-bonded to the nonwoven composite fabric by bringing a reverse surface of the net into contact with a front surface of the nonwoven composite fabric, wherein the net is formed by shaping wire materials obtained by mixing and melting a low melting point polyethylene resin and a high melting point polyethylene resin into a mesh-like reticular pattern, wherein the nonwoven composite fabric and the net are heated from a reverse surface of the nonwoven composite fabric, and wherein the nonwoven composite fabric and the net are bonded by the melted polyethylene fiber of the nonwoven composite fabric and the melted low melting point polyethylene resin and the melted high melting point polyethylene resin on the reverse surface side of the net maintaining its shape on the front surface side.

6. The netted food casing of claim 1, wherein the composite thermoplastic synthetic fiber is comprised of a fiber with a fiber diameter from 0.55 dtx to 5.5 dtx and having a core-clad structure including polyester as a core and polyethylene as a clad; an ultrafine polyester fiber having a fiber diameter from 0.1 dtx to 0.55 dtx; and a fiber having a core-clad structure including polyester as a core and low melting point polyester as a clad.

7. The netted food casing of claim 1, wherein when the nonwoven fabric is melted in thermal lamination, the air permeability and water permeability of the netted food casing is maintained by the plant fiber.

* * * * *